US008160976B2

(12) United States Patent  
Dwyer et al.

(10) Patent No.: US 8,160,976 B2  
(45) Date of Patent: Apr. 17, 2012

(54) SYSTEMS AND METHODS FOR ACHIEVING PLMN CONTINUITY WHEN MOVING BETWEEN NETWORKS OF DIFFERENT TYPES THROUGH NETWORK SELECTION

(75) Inventors: Johanna Dwyer, Kanata (CA); Paul Carpenter, Slough (GB); Adrian Buckley, Tracy, CA (US)

(73) Assignee: Research In Motion Limited, Waterloo, Ontario ( * ) Notice: Subject to any disclaimer, the term of this patent is extended or adjusted under 35 U.S.C. 154(b) by 547 days.

(21) Appl. No.: 12/426,093

(22) Filed: Apr. 17, 2009

(65) Prior Publication Data

US 2010/0268674 A1    Oct. 21, 2010

(51) Int. Cl.  
G06F 15/16 (2006.01)  
G06F 15/18 (2006.01)

(52) U.S. Cl. .......................................... 706/12; 709/228

(58) Field of Classification Search .................. 706/12  
See application file for complete search history.

(56) References Cited

U.S. PATENT DOCUMENTS

| | | | |
|---|---|---|---|
| 6,708,031 B2 * | 3/2004 | Purnadi et al. | 455/436 |
| 7,116,968 B2 * | 10/2006 | Koskinen et al. | 455/406 |
| 7,398,091 B2 * | 7/2008 | Chen | 455/454 |
| 7,561,876 B2 * | 7/2009 | Chiou et al. | 455/423 |
| 7,603,120 B2 * | 10/2009 | Rager et al. | 455/433 |
| 7,693,506 B1 * | 4/2010 | Back et al. | 455/432.1 |
| 7,697,935 B2 * | 4/2010 | Guyot et al. | 455/443 |
| 7,702,760 B2 * | 4/2010 | Latvakoski et al. | 709/221 |
| 7,852,825 B2 * | 12/2010 | Shaheen | 370/349 |
| 7,873,015 B2 * | 1/2011 | Gallagher et al. | 370/338 |
| 7,983,713 B2 * | 7/2011 | Sasse et al. | 455/556.1 |
| 8,041,335 B2 * | 10/2011 | Khetawat et al. | 455/404.2 |
| 8,045,980 B2 * | 10/2011 | Buckley et al. | 455/434 |
| 2006/0094427 A1 | 5/2006 | Buckley et al. | |
| 2006/0114871 A1 | 6/2006 | Buckley et al. | |
| 2008/0039086 A1 | 2/2008 | Gallagher et al. | |

FOREIGN PATENT DOCUMENTS

| | | |
|---|---|---|
| EP | 1968339 A1 | 9/2008 |
| WO | 2004040931 A2 | 5/2004 |
| WO | 2006047862 A1 | 5/2006 |
| WO | 2006056069 A1 | 6/2006 |

(Continued)

OTHER PUBLICATIONS

An Energy-Efficient Clustering Technique for Wireless Sensor Networks, Guan Xin; Wang YongXin; Liu Fang; Networking, Architecture, and Storage, 2008. NAS '08. International Conference on Digital Object Identifier: 10.1109/NAS.2008.51 Publication Year: 2008 , pp. 248-252.*

(Continued)

*Primary Examiner* — Michael B Holmes  
(74) *Attorney, Agent, or Firm* — Hanley, Flight & Zimmerman, LLC.

(57) ABSTRACT

Systems and methods for achieving PLMN continuity when moving between networks of different types through network selection are provided. When a mobile station moves from a first network type, such as cellular, to a second network type, such as GAN, if there is a PLMN discontinuity, this may result in a dropped call. In order to avoid this, networks for the first network type and the second network type are selected such that there is PLMN continuity. This can involve reselection of a different cellular network than one currently providing service to the mobile station.

20 Claims, 6 Drawing Sheets

FOREIGN PATENT DOCUMENTS

| | | |
|---|---|---|
| WO | 2008009016 A2 | 1/2008 |
| WO | 2008027660 A2 | 3/2008 |

OTHER PUBLICATIONS

A Cascaded Framework for Statistical Machine Translation System Combination, Jinhua Du; Wei Wei; Zhendong Yang; Bo Xu; Natural Language Processing and Knowledge Engineering, 2007. NLP-KE 2007. International Conference on Digital Object Identifier: 10.1109/NLPKE.2007.4368045 Publication Year: 2007, pp. 285-292.*

Consensus Network Decoding for Statistical Machine Translation System Combination, Sim, K.C.; Byrne, W.J.; Gales, M.J.F.; Sahbi, H.; Woodland, P.C.; Acoustics, Speech and Signal Processing, 2007. ICASSP 2007. IEEE International Conference on vol. 4 Digital Object Identifier: 10.1109/ICASSP.2007.367174 Pub Year: 2007, pp. IV-105-IV-108.*

IEEE Standard for Conceptual Modeling Language Syntax and Semantics for IDEF1X/Sub 97/ (IDEF/Sub Object/), IEEE Std 1320.2-1998, Digital Object Identifier: 10.1109/IEEESTD.1998.89426, Publication Year: 1998.*

Office Action dated Apr. 19, 2011 issued in respect of U.S. Appl. No. 12/426,105.

Taaghol et al.: "Seamless Integration of Mobile WiMAX in 3GPP Networks," IEEE Communications Magazine, IEEE Service Center, Piscataway, US, vol. 46, No. 10, Oct. 1, 2008, XP011236262.

Research in Motion UK LTD.: "43.318 CR0036 Clarification on the GANC Slection Process for PLMN Continuity," 3GPP TSG-GERAN 41, Valetta Malta No. GP-090164, Feb. 19, 2009, XP002567926, Retrieved from the Internet: URL:www.3gpp.org/ftp//Specs/html-info/43318-CRs.htm> [retrieved on Feb. 19, 2010].

3GPP Draft, GP-071614, 3rd Generation Partnership Project (3GPP), Mobile Competence Centre; 650, Route Des Lucioles; F-06921 Sophia-Antipolis Cedex, France; vol. TSG GERAN, No. Vancouver; 20071102, Nov. 2, 2007, XP050018973.

Ericsson: "PLMN Selection Impacts Because of GAN," 3GPP Draft; C1-072370, 3rd Generation Partnership Project (3GPP), Mobile Competence Centre; 650, Route Des Lucioles; F-06921 Sophia-Antipolis Cedex, France; vol. CT WG1, No. Kobe, Japan; 20071001, Oct. 1, 2007, XP050026516 paragraphs [0002] -[3.2.2].

3rd Generation Partnership Project (3GPP) et al.: "Universal Mobile Telecommunications System (UMTS); TR 23.913 Turbo-Charger Technical Report version 1.0.0," Internet Citation, Feb. 16, 2009, XP002161729, Retrieved from the Internet: URL:http://www.3gpp.org/gtp/TSG_CN/TSG_CN/TSGN_06/tdocs/PDF/NP-99457.pdf> [retrieved on Feb. 28, 2010].

ETSI TS 124 234 v8.2.0 (Apr. 2009): "Universal Mobile Telecommunications System (UMTS); LTE; 3GPP System to Wireless Local Area Network (WLAN) Interworking; WLAN User Equipment (WLAN UE) to Network Protocols; Stage 3 (3GPP TS 24.234 version 8.2.0 Release 8)".

3GPP TS 23.003 v8.4.0 (Mar. 2009): "3rd Generation Partnership Project; Technical Specification Group Core Network and Terminals; Numbering, Addressing and Identification (Release 8)".

3GPP TS 43.318 v8.4.0 (Feb. 2009): "3rd Generation Partnership Project; Technical Specification Group GSM/EDGE Radio Access Network; Generic Access Network (GAN); Stage 2 (Release 8)".

3GPP TS 23.122 v8.5.0 (Mar. 2009): "3rd Generation Partnership Project; Technical Specification Group Core Network and Terminals; Non-Access-Stratum (NAS) Functions Related to Mobile Station (MS) in Idle Mode (Release 8)".

3GPP TS 22.011 v9.1.0 (Mar. 2009): "3rd Generation Partnership Project; Technical Specification Group Services and System Aspects; Service Accessibility (Release 9)".

3GPP TS 44.318 v8.5.0 (Feb. 2009): "3rd Generation Partnership Project; Technical Specification Group GSM/EDGE Radio Access Network; Generic Access Network (GAN); Mobile GAN Interface Layer 3 Specification (Release 8)".

* cited by examiner

SYSTEMS AND METHODS FOR ACHIEVING PLMN CONTINUITY WHEN MOVING BETWEEN NETWORKS OF DIFFERENT TYPES THROUGH NETWORK SELECTION

FIELD

The application relates to moving between networks having different network types.

BACKGROUND

Cellular coverage has historically been provided by wireless access networks having base stations, and operating using cellular protocols. Examples of cellular radio access networks include GSM/EDGE RADIO ACCESS NETWORK (GERAN) Universal Terrestrial Radio Access Network (UTRAN), or Evolved Universal Terrestrial Radio Access Network (E-UTRAN).

Wi-Fi is a popular wireless networking technology that uses radio waves to provide wireless high-speed Internet and network connections. The Wi-Fi Alliance, the organization that owns the Wi-Fi (registered trademark) term specifically defines Wi-Fi as any "wireless local area network (WLAN) products that are based on the Institute of Electrical and Electronics Engineers' (IEEE) 802.11 standards." Wi-Fi is an example of a technology that provides wireless IP connectivity.

GAN stands for Generic Access Network (GAN). It is designed to complement traditional GERAN, UTRAN, or E-UTRAN cellular radio access network coverage by allowing coverage for cellular subscribers to be extended to areas covered by Wi-Fi networks. This is achieved by tunnelling Non Access Stratum (NAS) protocols between the MS (mobile station) and the Core Network over an IP network. These protocols run over top the IP protocol provided by the WLAN network or other radio IP based network. A network node in GAN is referred to as a GANC (GAN controller), and it is used to provide the interworking between the radio IP based network and the traditional GERAN, UTRAN, or E-UTRAN cellular radio access networks.

The MS may have a preferred mode of operation vis-à-vis the use of GAN, or not, that can be configured by the user, or by the operator through various mechanisms. This information is stored in the "GAN Mode Selection Preferences Field". The modes of operation that the MS may use are GERAN/UTRAN-only, GERAN/UTRAN-preferred, GAN-preferred, and GAN-only.

If the mode selection preference for the MS is GERAN/UTRAN-preferred, then the MS accesses voice or data services in GERAN/UTRAN as long as there is a suitable GERAN cell or a suitable UTRAN cell available. If the MS cannot find a suitable GERAN or UTRAN cell to camp on, and the MS has successfully registered with a GANC, then the MS switches to GAN mode. Being "camped on" a particular cell means that in idle mode, the MS has assessed the surrounding cells that it can see and has chosen a cell which will offer it a suitable radio connection. From the radio propagation point of view it is desirable that the MS camps on a cell with the lowest path loss, however there may be other reasons or criteria by which the MS chooses a particular cell. As the user moves, the camped on cell may become unsuitable. This situation will generate a cell re-selection. (see 3GPP 45.008 Section 6: Idle Mode Tasks). When the MS in GAN mode is able to find a suitable GERAN/UTRAN cell to camp on, or the MS has de-registered or loses connectivity with the GANC over the generic IP access network, the MS returns to GERAN/UTRAN mode.

If the mode selection preference for the MS is GAN-preferred, when the MS has successfully registered with the GAN over the generic IP access network, the MS switches to GAN mode and stays in this mode as long as the GAN is available. When the MS deregisters, or otherwise loses connectivity with the GAN, the MS switches to GERAN/UTRAN mode.

In a given cellular coverage area, multiple different service providers may be available. Each service provider has a respective network referred to as a PLMN (public land mobile network). Similarly, each PLMN may have an associated set of GANCs that control interworking between the PLMN and the GAN, effectively extending the coverage of the service provider. A GANC is typically associated with one PLMN. However a GANC could be associated with multiple PLMNs.

When a MS is attempting PLMN selection in GAN mode, only PLMNs available via GAN may be considered. The MS may be able to connect via several GANCs that are associated with different PLMNs. When the MS moves into GAN, it will ultimately register with a GANC and in doing so has also registered with the associated PLMN for access while in GAN.

A GANC is a physical node. Each GANC can play one or more of three logical roles: provisioning GANC, Default GANC, Serving GANC.

A GAN-capable PLMN (an operator that has GANC nodes associated with its network), stores in memory of MSs the IP address or FQDN (fully qualified domain name) associated with a GAN Controller that can be used to access its network. The GANC that is addressed in memory is referred to as the "provisioning GANC" for that network. Initially, discovery requests are made to the provisioned GANC. This "provisioned" GANC gives access to the HPLMN (home PLMN) and will let the MS know the address of a default GANC (also in the HPLMN). The HPLMN is the PLMN that the mobile device is subscribed to. The default GANC may or may not be the same as the provisioning GANC.

The MS uses the address of the default GANC in order to attempt to register to it. The default GANC is the logical network node for GAN services that is always connected to the HPLMN. The default GANC can accept, reject or redirect registration attempts from the MS. The GANC that ultimately provides access to the MS is called the serving GANC. The default GANC is the logical role of a GANC in the HPLMN, and it may redirect an MS performing the GAN Registration Procedure to a preferred Serving GANC. The Serving GANC and the Default GANC may be the same entity, in which case no redirection is required.

Note that the GANC's physical location is up to the network operator. The MS connects with the GANC by tunnelling over the internet, so the GANC's physical location is irrelevant and meaningless to the MS. A GANC is like the network operator's VPN server that allows mobile stations to connect to the core network (i.e. SGSNs for data and MSCs for voice) from any internet access point.

The process of registering with GAN starts with the transmission of a GA-RC REGISTER REQUEST sent from the MS to the GANC. The MS may or may not be required to select a GANC as part of the registration process. If, during GAN registration, the MS has a choice amongst two or more GANC-PLMN pairs, then GANC selection takes place. The MS may be informed of available GANC-PLMN pairs via a GAN PLMN list. The GAN PLMN list can be sent to the MS as part of the GA-RC REGISTER REDIRECT message, which is sent to the MS from the Default GANC in response to a GA-RC REGISTER REQUEST.

A handover refers to switching the point of connectivity with the network, be it cellular or GAN while communications are active, also referred to as being in dedicated mode (while an active voice call or data session is in progress). A handover into GAN refers to disconnecting from a cellular base station or (e)Node B or equivalent, and connecting to a GANC, while a handover out of GAN refers to disconnecting from a GANC and connecting to a cellular base station or (e)Node B or equivalent. This is to be contrasted with roving into and out of GAN which refers to idle mode transitions.

The signalling between PLMNs to support seamless handovers exists but in practice this is used very rarely, because coordination and synchronization between two networks is considered to be too much overhead. As a result, having to switch PLMNs during an active communication session most often results in a discontinuation of that communication session. This results in a poor user experience.

DETAILED DESCRIPTION

Figure 1:
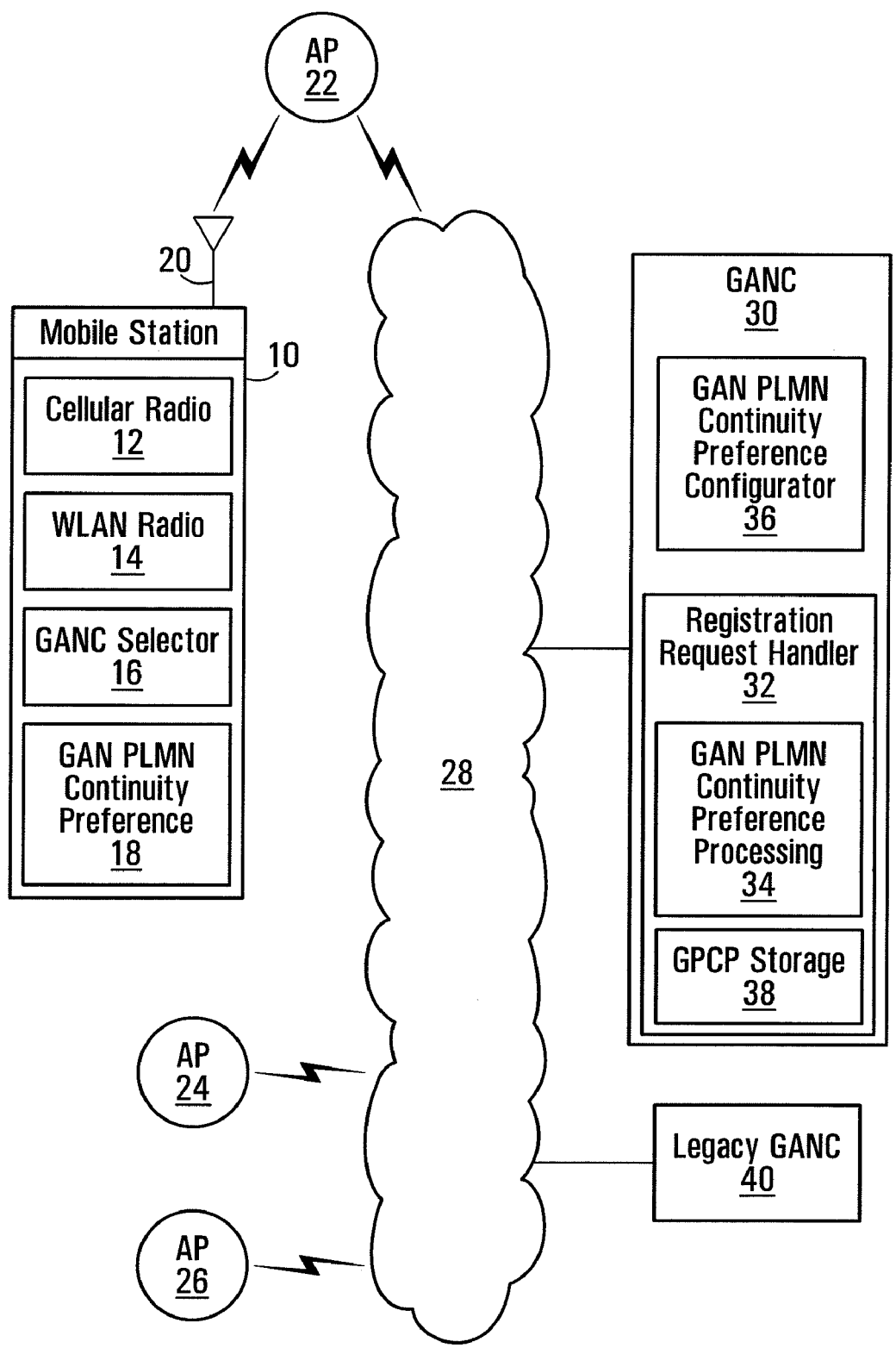
FIG. 1 is a network diagram depicting an example GAN access scenario.

According to one broad aspect, the application provides a method comprising: making a network list consisting of the PLMNs that are available via a second network type by looking at available PLMNs in conjunction with a previously received PLMN list; making a list of available PLMNs for a first network type; comparing the network list to a list of available PLMNs for the first network type; determining a common PLMN that is available via both the first network type and the second network type or determining a PLMN available in the first network type for which there is an EPLMN available in the second network type; attempting to perform registration in the first network type and the second network type with the common PLMN, or the PLMN, EPLMN combination thus determined.

According to another broad aspect, the application provides a mobile station comprising: a first wireless network radio for accessing a first network type; a second wireless network radio for accessing a second network type; a network selector configured to: make a network list consisting of the PLMNs that are available via a second network type by looking at available PLMNs in conjunction with a previously received PLMN list; make a list of available PLMNs for a first network type; compare the network list to a list of available PLMNs for the first network type; determine a common PLMN that is available via both the first network type and the second network type or determining a PLMN available in the first network type for which there is an EPLMN available in the second network type; attempt to perform registration in the first network type and the second network type with the common PLMN, or the PLMN, EPLMN combination thus determined.

According to another broad aspect, the application provides a computer readable medium having computer executable instructions for execution by a mobile station, that when executed, cause the mobile station to implement a method comprising: making a network list consisting of the PLMNs that are available via a second network type by looking at available PLMNs in conjunction with a previously received PLMN list; making a list of available PLMNs for a first network type; comparing the network list to a list of available PLMNs for the first network type; determining a common PLMN that is available via both the first network type and the second network type or determining a PLMN available in the first network type for which there is an EPLMN available in the second network type; attempting to perform registration in the first network type and the second network type with the common PLMN, or the PLMN, EPLMN combination thus determined.

When moving into or out of GAN, it is possible for the PLMN associated with the Serving GANC to be different than the PLMN that the MS registers to in cellular mode. If the PLMN changes during a transition between GAN and cellular, then the call or data session is typically released because of lack of coordination between PLMNs, and this results in a poor experience for the user. Specifically, suppose a MS has an active call or data session while operating in a cellular coverage area using a first PLMN that will be referred to as PLMN1. The MS then moves into a GAN coverage area and registers with a GANC associated with PLMN2 which is different from PLMN1. When this occurs, the call or data session is released. Similarly, suppose a MS has an active call or data session while operating in a GAN coverage area using a first PLMN that will be referred to as PLMN1. The MS then moves into a cellular coverage area and connects to a base station or (e)Node B or equivalent associated with PLMN2 which is different from PLMN1. When this occurs, the call or data session is typically released.

The issue of PLMN continuity for GAN is especially applicable when the MS is moving between GAN and the cellular network (in either direction), and is relevant to GERAN/UTRAN-preferred (more generally cellular-preferred) and GAN-preferred modes of operation since GAN-only and GERAN/UTRAN-only (cellular-only) modes do not allow for such transitions. The issue of PLMN continuity for GAN also applies to other situations, such as when the MS is moving between GANs or between different radio access networks in general.

In some embodiments described below, the MS may request the Default GANC to send a GAN PLMN list. This procedure may allow the MS to obtain a list of available GANC-PLMN pairs, for example when its registration attempt on the stored Serving GANC or Default GANC resulted in a PLMN mismatch. This may be done, for example, using a GA-RC REGISTER UPDATE uplink message.

Referring to FIG. 1, shown is a network diagram depicting an example GAN access scenario. Shown is a MS 10, a plurality of WLAN access points (AP) 22,24,26, a network cloud 28, a GANC 30, and a legacy GANC 40. At the instant depicted, the MS 10 has wireless connectivity to access point 22. More generally, the discussion presented herein applies to GAN access scenarios in which there are any number of MSs, any number of access points, and any number of GANCs.

Network cloud 28 represents any network connectivity between the access points 22,24,26 and the GANCs 30,40. This may for example include parts of the public Internet and or private networks.

The MS 10 has a cellular radio 12 through which cellular communication takes place. The MS 10 has a WLAN radio 14 for connecting to WLAN access points. The MS 10 has a GANC selector 16 responsible for deciding if and when to attempt to register with GAN, and for deciding which GANC to register with. The MS has a GAN PLMN continuity preference storage element 18 for storing a GAN PLMN continuity preference (GPCP). The preference can be stored in any suitable form; specific examples include a token or an identifier. This storage element can be in internal or external memory of any appropriate form.

GANC 30 is a GANC that is configured to recognize the GAN PLMN continuity preference information when received from a MS such as MS 10. The GANC 30 has a registration request handler 32 responsible for processing registration requests. The registration request handler 32 has a GAN PLMN continuity preference processing function 34 which takes into account a GAN PLMN continuity preference received from a MS. In some embodiments, the GANC 30 also includes a GAN PLMN continuity preference configurator 36 for configuring the GAN PLMN continuity preference on a MS. In some embodiments, the GANC 30 also includes GPCP storage 38 for storing the GPCP of MSs. This might be for the purpose of configuring the GPCP of MSs in which case the configurator 36 sends this information to the MS. In another example, the GPCP storage 38 is for storing the GPCP received from an MS, for example in association with an IP address or other identifier of the MS.

Legacy GANC 40 is a GANC which is not configured to recognize the GAN PLMN continuity preference information.

Some embodiments provide a mechanism for the MS to send the GAN PLMN continuity preference to a GANC, and for a GANC such as GANC 30 to receive the GAN PLMN continuity preference information. Some embodiments provide mechanisms for a GANC such as GANC 30 to make use of such GAN PLMN continuity preference information, and some embodiments provide mechanisms for a MS such as MS 10 to make use of the GAN PLMN continuity preference information.

In operation, when the MS decides to register with GAN, it starts by sending a registration message to the default GANC. The MS 10 transmits the GAN PLMN continuity preference, for example in a registration message or post-registration message. The behaviour of the MS and the default GANC is a function of whether or not the default GANC is a configured to recognize the GAN PLMN continuity preference (as is the case for GANC 30), or the default GANC is not configured to recognize the GAN PLMN continuity preference (as is the case for legacy GANC 40).

Where the default GANC is configured to recognize the GAN PLMN continuity preference, it will process the registration request as a function of the GAN PLMN continuity preference by selecting between a) accepting the registration request, b) rejecting the registration request, and c) performing a registration redirect. Many examples of this processing are detailed below.

The MS receives a response from the default GANC, and handles the response based on a PLMN continuity preference for the MS. Many examples of this are detailed below.

The HPLMN is the network to which a mobile station is subscribed. An EHPLMN (equivalent HPLMN) is another network that can provide service to the mobile station in substantially the same manner as the HPLMN, for example without incurring roaming charges. HPLMN and EHPLMN relationships may occur as a result of network operator mergers, for example. No PLMN discontinuity results from being registered on the HPLMN for cellular and an EHPLMN for GAN.

The RPLMN (registered PLMN) is the PLMN with which a mobile station is registered in cellular. An equivalent RPLMN (ERPLMN) is a PLMN that is equivalent to the RPLMN in the sense that ERPLMN provides service to the mobile station in substantially the same manner as the RPLMN. No PLMN discontinuity results from being registered on the HPLMN for cellular and an EHPLMN for GAN, or vice versa.

GAN PLMN Continuity Preference Indication

A mechanism is provided that allows the MS to be able to communicate to the network whether or not it requires or would prefer to maintain PLMN continuity. In some embodiments, the information from this field is used in various registration messages, as described more fully below.

Preference for PLMN continuity refers generally to preferences for a MS in respect of the maintenance of continuity of PLMN when moving into or out of GAN. This preference will be referred to as the GAN PLMN continuity preference (GPCP) introduced above. In some embodiments, the GPCP is used to indicate one of four preferences. These four specific preferences are described below. More generally, the number of possible preferences, and their definitions, may be different than this specific example.

While in idle mode or dedicated mode, the MS may also move between GANCs. The preference for PLMN continuity may extend to movement between GANCs. If the MS if moving to a different GANC from the current serving GANC, the MS will attempt to try and register with a different target GANC while still maintaining the IPsec tunnel to its current serving GANC. As part of the registration procedure the MS will learn which PLMN the target GANC is associated with. If the PLMN associated with the target GANC is acceptable (according to the MSs GPCP field), then the MS completes the registration with the target GANC. If the MS is in dedicated mode, it then performs a handover to the new GANC. If it is in dedicated mode or idle mode it subsequently de-registers from the previous serving GANC. If the PLMN associated with the target GANC is not acceptable (according to the MSs GPCP field), then the MS looks for other GANCs and repeats the process just described. Alternately the MS may trigger the serving GANC to send it a GAN PLMN list using an extension to the REGISTER UPDATE MESSAGE (if in idle mode) or the CLASSMARK change procedure (if in dedicated mode) and may subsequently re-select based on this list.

PLMN Continuity Required

Generally, the PLMN Continuity Required preference indication is used to indicate that the MS requires PLMN continuity.

This is, for example, the case when the MS wants to be registered in GAN on a PLMN that is the same as the RPLMN or that is an equivalent PLMN to the RPLMN (i.e. EPLMN). In some embodiments, when the MS cannot register in GAN on such a PLMN, this preference indication is used to indicate that PLMN re-selection in cellular should be performed in order to permit the MS to stay on the same PLMN in GAN and cellular modes. Another example of when this may be used is when the MS is engaged in an active session such as but not limited to a voice call and when the MS needs to handover the call to the GANC, for example when the coverage in cellular is too weak to maintain the call but the coverage in GAN is sufficient, it can do so without dropping the call.

PLMN Continuity Preferred

The MS may "prefer" PLMN continuity and can use the PLMN Continuity Preferred indication. In this case, PLMN continuity is not essential for registration with GAN, but if there is any way that it can be achieved this will be done.

GANC Associated with HPLMN or EHPLMN Required

The GANC Associated with HPLMN or EHPLMN Required indication is the case where the user (or the user's operator) wants to force the MS to use a GANC associated with the HPLMN or EHPLMN and not to use GAN at all if this cannot be realized. (This would include the Default GANC or another GANC that is associated with the HPLMN or EHPLMN). This may be the case where there are specific roaming or billing reasons not to allow the MS to connect to a GANC associated with a VPLMN (Visited Public Land Mobile Network). Note that this preference may result in a PLMN continuity mismatch.

No Preference

The No Preference indication is used to indicate that there is no restriction on the GANC used. For example, the MS might behave according to 3GPP TS 44.318. In this case it is completely up to the network whether to register the MS in a way that it has PLMN continuity or not, and the MS will accept whatever situation it finds itself in.

Configuring the GAN PLMN Continuity Preference for a MS

In a specific example, two bits can be used to indicate one of the four possible GAN PLMN continuity preferences described above, although it is of course to be clearly understood that other data structures can alternatively be employed.

The GAN PLMN Continuity preference is stored on the MS. The GAN PLMN continuity preference is stored in memory (removable or not) on the MS in any appropriate form, such as, but not limited to a bit flag/token/identifier or other field, list, or data structure. In some embodiments, proprietary fields in the MS may be used to store the GAN PLMN continuity preference. In various possible implementations, this may be provisioned during manufacture/device setup, provisioned by a user via user interface on the MS, or provisioned by the network. The operator may provision the settings using OMA DM (Open Mobile Alliance Device Management), OTA (over the air) provisioning, ANDSF (Access Network Discovery and Selection Function) or any other standardized or proprietary mechanism. These provisioning mechanisms may make use of USSD (unstructured supplementary service data), SMS (short message service), Cell Broadcast, MBMS, generic IP pipe or other transport mechanism.

In some embodiments, the preference indication may exist as an EF (Elementary File) on the Universal Subscriber Identity Module (USIM). An example of this file is as described below, and is referred to as $EF_{GPCP}$ (GAN PLMN Continuity Preference).

Table 1 below shows an example of an EF containing an indication to the MS regarding the preference for maintaining PLMN continuity when moving in either direction between GAN and cellular networks and optionally also when moving between GANCs.

TABLE 1

PLMN Continuity Preference EF

| Identifier: 'xxxx' | Structure: transparent | Optional |
|---|---|---|
| File size: 1 byte | | Update activity: low |

| Access Conditions: | |
|---|---|
| READ | PIN |
| UPDATE | ADM |
| DEACTIVATE | ADM |
| ACTIVATE | ADM |

| Bytes | Description | M/O | Length |
|---|---|---|---|
| 1 | GAN PLMN Continuity Preference | O | 1 byte |

GAN PLMN Continuity Preference:

Contents:

MS PLMN Continuity Preference
Coding:

'00' - No preference
'01' - GANC Associated with HPLMN or EHPLMN required
'10' - MS prefers PLMN continuity
'11' - MS requires PLMN continuity
All other values are reserved for future use.

In yet another example, GAN PLMN continuity preference information may be provisioned on the MS as part of the GAN Mode Selection Preferences Field. In this case, the network operator may be able to change this preference in a field in a message such as the REGISTER REDIRECT message. An example of this is detailed below. If the GAN PLMN Continuity Preference is updated to indicate "No Preference", or if the EF is not there as in the case of a legacy system, then the MS will follow PLMN selection techniques without regard to maintaining GAN PLMN continuity, for example, as currently described in 3GPP TS 43.318 and 3GPP TS 44.318.

Table 2 below shows the GA-GC Register Redirect message structure from 3GPP TS 44.318 modified to include a GAN PLMN Continuity Preference Field. The GANC may use this message to redirect the MS to another GANC. In this case the message will contain the Serving GANC-SEGW and Serving GANC information. The message may also contain information about one or more PLMN identities where the MS may be served while in GAN coverage.

TABLE 2

GA-RC REGISTER REDIRECT message content

| IEI | Information Element | Type/ Reference | Presence | Format | Length | Value | Notes |
|---|---|---|---|---|---|---|---|
| | Length Indicator | Length Indicator 11.1.1.1 | M | V | 2 | | |

TABLE 2-continued

GA-RC REGISTER REDIRECT message content

| IEI | Information Element | Type/ Reference | Presence | Format | Length | Value | Notes |
|---|---|---|---|---|---|---|---|
|  | GA-RC Protocol Discriminator | Protocol Discriminator 11.1.1.2 | M | V | ½ | 0000 |  |
|  | Skip Indicator | Skip Indicator 11.1.1.3 | M | V | ½ | 0000 |  |
|  | GA-RC REGISTER REDIRECT Message Type | Message Type 11.1.1.4 | M | V | 1 |  |  |
| 9 | Serving GANC-SEGW IP address | IP Address 11.2.9 | C | TLV | 7-19 |  |  |
| 10 | Serving GANC-SEGW FQDN | Fully Qualified Domain/Host Name 11.2.10 | C | TLV | 5-258 |  |  |
| 97 | Serving GANC IP address | IP Address 11.2.9 | C | TLV | 7-19 |  |  |
| 98 | Serving GANC FQDN | Fully Qualified Domain/Host Name 11.2.10 | C | TLV | 5-258 |  |  |
| 103 | Serving GANC TCP port number | Communication port 11.2.25 | O | TLV | 4 |  |  |
| 67 | Serving GANC table indicator | Serving GANC table indicator 11.2.67 | O | TLV | 3 |  |  |
| 69 | GAN PLMN List | GAN PLMN List 11.2.69 | C | TLV | n |  |  |
| xxx | GAN PLMN Continuity Preference | PLMN Continuity Preference, 11.2.xxx | O | TLV | 3 |  |  | where the GAN PLMN Continuity Preference IE is, for example, as in Table 3 below:

TABLE 3

| GAN Continuity Preference IE | | | | | | | |
|---|---|---|---|---|---|---|---|
| 8 | 7 | 6 | 5 | 4 | 3 | 2 | 1 |
| PLMN Continuity Preference IEI | | | | | | | octet 1 |
| Length of PLMN Continuity Preference contents | | | | | | | octet 2 |
| Spare | | | | | | CP | octet 3 | where CP (Continuity Preference) is defined, for example, as in Table 4 below.

TABLE 4

| CP Definition CP Continuity Preference (octet 3) | | |
|---|---|---|
| Bit 1 | Bit 0 |  |
| 1 | 1 | MS requires PLMN continuity |
| 1 | 0 | MS prefers PLMN continuity |

TABLE 4-continued

| CP Definition CP Continuity Preference (octet 3) | | |
|---|---|---|
| Bit 1 | Bit 0 |  |
| 0 | 1 | GANC Associated with HPLMN or EHPLMN required |
| 0 | 0 | no preference |

Communicating the GAN PLMN Continuity Preference (GPCP) to the Network

The MS can communicate its GAN PLMN Continuity Preference to the GANC when attempting to register for GAN Services.

In some embodiments, the MS communicates its GAN PLMN Continuity Preference to a GANC in, for example, an uplink message. Examples of uplink messages where the GPCP can be indicated include registration messages and post-registration messages. A registration message is a message sent by an MS when it first tries to register for GAN services. A post-registration message is a message sent by an MS after it has already registered for GAN services, for example to perform status changes.

A specific example of a registration message is the Registration Request (GA-RC REGISTER REQUEST) defined in 3GPP TS 44.318. A specific example of a post-registration message is the Registration Update message (GA-RC REGISTER UPDATE UPLINK message) defined in 3GPP TS 44.318. The Registration Update message may be used for many reasons, for instance if the MS acquires GERAN/UTRAN coverage for the first time after reporting no coverage to the GANC during the registration process. The full list of uses of this message is given in 3GPP TS 44.318 Section 6.3.1. The GA-RC REGISTER UPDATE UPLINK message is used from the MS to the GANC, and it currently includes a Required GAN Services IE (information element). Examples of post-registration messages that might be used in dedicated mode include the GA-CSR CLASSMARK CHANGE and the GA-CSR UTRAN CLASSMARK CHANGE messages. The GANC initiates the classmark interrogation procedure by transmitting the GA-CSR CLASSMARK ENQUIRY message to the MS when it desires more information about the MS capabilities. In the "early classmark sending" case, if allowed, the GA-CSR (UTRAN) CLASSMARK CHANGE message can be sent by the MS once it is in dedicated mode. In some embodiments, these messages are enhanced to include an additional field for the GPCP as illustrated in the table below for the case of the GA-CSR CLASSMARK CHANGE MESSAGE (described in section 10.1.27 of 3GPP TS 44.318):

| | | GA-CSR CLASSMARK CHANGE message content | | | | | |
|---|---|---|---|---|---|---|---|
| IEI | Information Element | Type/Reference | Presence | Format | Length | Value | Notes |
| | Length Indicator | Length Indicator 11.1.1.1 | M | V | 2 | | |
| | GA-CSR Protocol Discriminator | Protocol Discriminator 11.1.1.2 | M | V | ½ | 0001 | |
| | Skip Indicator | Skip Indicator 11.1.1.3 | M | V | ½ | 0000 | |
| | GA-CSR CLASSMARK CHANGE message identity | Message Type 11.1.1.4 | M | V | 1 | | |
| 28 | Mobile Station Classmark 2 | Mobile Station Classmark 2 11.2.28 | M | TLV | 5 | | |
| 56 | Additional Mobile Station Classmark Information | Mobile Station Classmark 3 11.2.56 | C | TLV | 3-14 | | |
| xxx | GAN PLMN Continuity Preference | PLMN Continuity Preference, 11.2.xxx | O | TLV | 3 | | |

In some embodiments, when the MS prefers PLMN Continuity but has not achieved this during the initial registration, the GA-RC REGISTER UPDATE UPLINK message is used to signal the GAN PLMN Continuity Preference of the MS using a continuity request. Alternatively, the MS may use this update procedure or the classmark change procedure to signal a change in the GAN PLMN continuity preference, as configured by a user of the device or an operator to name two specific examples. This can be done by the addition of a new dedicated information element, a "PLMN Continuity Request", to these messages. Alternatively, the GAN PLMN Continuity Preference Request may be signaled in the GA-RC REGISTER UPDATE UPLINK message by a new field that is added to the existing Required GAN Services IE. Table 5 below shows examples of both of these cases, namely a modified Required GAN Services IE (see Information Element Identifier (IEI) 71 in the table) that includes the PLMN Continuity Preference, and a new IE referred to as "PLMN continuity Request" (see IEI xxx in the table) that includes the PLMN Continuity Preference. In some embodiments, only one of these alternatives are implemented. In another embodiment, both are implemented and either can be used in a given instance. The GPCP format provided is a specific example; other formats can alternatively be employed. The modified Required GAN Services IE and a possible new IE is shown in the modified GA-RC REGISTER UPDATE UPLINK message content below.

TABLE 5 modified GA-RC REGISTER UPDATE UPLINK message

| IEI | Information Element | Type/ Reference | Presence | Format | Length | Value | Notes |
|---|---|---|---|---|---|---|---|
|  | Length Indicator | Length Indicator 11.1.1.1 | M | V | 2 |  |  |
|  | GA-RC Protocol Discriminator | Protocol Discriminator 11.1.1.2 | M | V | ½ | 0000 |  |
|  | Skip Indicator | Skip Indicator 11.1.1.3 | M | V | ½ | 0000 |  |
|  | GA-RC REGISTER UPDATE UPLINK message identity | Message Type 11.1.1.4 | M | V | 1 |  |  |
| 3 | AP Radio Identity | Radio Identity 11.2.3 | O | TLV | 9 |  |  |
| 6 | Coverage Indication | GERAN/UTRAN Coverage Indicator 11.2.6 | O | TLV | 3 |  |  |
| 4 | GERAN Cell Identity | GERAN Cell Identity 11.2.4 | C | TLV | 4 |  |  |
| 5 | Location Area Identification | Location Area Identification 11.2.5 | C | TLV | 7 |  |  |
| 41 | Routing Area Code | Routing Area Code 11.2.41 | C | TLV | 3 |  |  |
| 8 | Geographic Location | Geographical Location 11.2.8 | O | TLV | 9-n |  |  |
| 42 | AP Location | AP Location 11.2.42 | O | TLV | 7-n |  |  |
| 71 | Required GAN Services | Required GAN Services 11.2.71 | O | TLV | 3 |  |  |
| 73 | 3G Cell Identity | 3G Cell Identity 11.2.73 | C | TLV | 6 |  |  |
| 61 | AP Service Name | AP Service Name 11.2.61 | C | TLV | 4-260 |  |  |
| 82 | 3G UARFCN | 3G UARFCN 11.2.82 | O | TLV | 4 |  |  |
| xxx | PLMN Continuity Request | PLMN Continuity Request 11.2.xxx | O | TLV | 3 |  |  |

Required GAN Services

As indicated above, in some embodiments, the Required GAN services IE is modified to include GAN PLMN continuity preference. The purpose of the (Required GAN Services) IE is to indicate to the GANC that the MS requires a GAN related specific service and which of the GAN services the MS requires. Table 6 contains an example definition of the Required GAN Services IE modified to include the GAN PLMN continuity preference, as a two bit CR (continuity request) in the table:

TABLE 6

| Required GAN Services IE with CR | | | | | | | | |
|---|---|---|---|---|---|---|---|---|
| 8 | 7 | 6 | 5 | 4 | 3 | 2 | 1 | |
| Required GAN Services IEI | | | | | | | | octet 1 |
| Length of Required GAN Services contents | | | | | | | | octet 2 |
| Spare | | | | | CR | | CBS | octet 3 | where CR and CBS are defined in Table 7 below.

TABLE 7

| CR and CBS definitions | |
|---|---|
| CBS Cell Broadcast Service (octet 3) | |
| Bit 1 | |
| 0 | CBS is not required by the mobile station |
| 1 | CBS is required by the mobile station. |
| CR Continuity Request (octet 3) | |
| Bit | |
| 1 0 | |
| 1 1 | MS requires PLMN continuity |
| 1 0 | MS prefers PLMN continuity |

TABLE 7-continued

| CR and CBS definitions | | |
|---|---|---|
| 0 | 1 | GANC associated with HPLMN or EHPLMN required |
| 0 | 0 | no preference |

PLMN Continuity Request

As indicated above, in some embodiments, a new PLMN Continuity Request IE is used to signal the GAN PLMN continuity preference. Table 8 below is an example definition.

TABLE 8

| PLMN Continuity Request IE | | | | | | | | |
|---|---|---|---|---|---|---|---|---|
| 8 | 7 | 6 | 5 | 4 | 3 | 2 | 1 | |
| PLMN Continuity Request IEI | | | | | | | | octet 1 |
| Length of PLMN Continuity Request contents | | | | | | | | octet 2 |
| Spare | | | | | | CR | | octet 3 | where CR is defined in Table 9 below.

TABLE 9

| CR Definition CR Continuity Request (octet 3) | | |
|---|---|---|
| Bit 1 | Bit 0 | |
| 1 | 1 | MS requires PLMN continuity |
| 1 | 0 | MS prefers PLMN continuity |
| 0 | 1 | GANC Associated with HPLMN or EHPLMN required |
| 0 | 0 | no preference |

In some embodiments, the Required GAN Services IE or the PLMN Continuity Request IE can also, or alternatively, be sent with an initial registration request message (GA-RC REGISTER REQUEST message). This can allow the MS to inform the Default GANC on the first registration attempt that it is looking for PLMN continuity. The GA-RC REGISTER REQUEST message is shown in the following table, with the modification to the Required GAN Services IE and the addition of the new PLMN Continuity Request IE.

TABLE 10

| GA-RC REGISTER REQUEST | | | | | | | |
|---|---|---|---|---|---|---|---|
| IEI | Information Element | Type/ Reference | Presence | Format | Length | Value | Notes |
| | Length Indicator | Length Indicator 11.1.1.1 | M | V | 2 | | |

TABLE 10-continued

GA-RC REGISTER REQUEST

| IEI | Information Element | Type/Reference | Presence | Format | Length | Value | Notes |
|---|---|---|---|---|---|---|---|
|  | GA-RC Protocol Discriminator | Protocol Discriminator 11.1.1.2 | M | V | ½ | 0000 |  |
|  | Skip Indicator | Skip Indicator 11.1.1.3 | M | V | ½ | 0000 |  |
|  | GA-RC REGISTER REQUEST message identity | Message Type 11.1.1.4 | M | V | 1 |  |  |
| 1 | IMSI | Mobile Identity 11.2.1 | M | TLV | 10 |  |  |
| 2 | GAN Release Indicator | GAN Release Indicator 11.2.2 | M | TLV | 3 |  |  |
| 7 | GAN Classmark | GAN Classmark 11.2.7 | M | TLV | 4 |  |  |
| 3 | AP Radio Identity | Radio Identity 11.2.3 | C | TLV | 9-n |  |  |
| 96 | MS Radio identity | Radio Identity 11.2.3 | M | TLV | 9-n |  |  |
| 17 | GSM RR/UTRAN RRC State | GSM RR/UTRAN RRC State 11.2.17 | M | TLV | 3 |  |  |
| 6 | Coverage Indication | GERAN/UTRAN coverage Indicator 11.2.6 | M | TLV | 3 |  |  |
| 4 | GERAN Cell Identity | GERAN Cell Identity 11.2.4 | C | TLV | 4 |  |  |
| 5 | Location Area Identification | Location Area Identification 11.2.5 | C | TLV | 7 |  |  |
| 41 | Routing Area Code | Routing Area Code 11.2.41 | C | TLV | 3 |  |  |
| 8 | Geographic Location | Geographical Location 11.2.8 | O | TLV | 9-n |  |  |
| 42 | AP location | AP Location 11.2.42 | O | TLV | 7-n |  |  |
| 21 | Register Reject Cause | Register reject Cause 11.2.21 | C | TLV | 3 |  |  |
| 11 | Redirection Counter | Redirection Counter 11.2.11 | C | TLV | 3 |  |  |
| 9 | Last GANC-SEGW IP address | IP Address 11.2.9 | C | TLV | 7-19 |  |  |
| 10 | Last GANC-SEGW FQDN | Fully Qualified Domain/Host Name 11.2.10 | C | TLV | 5-258 |  |  |
| 97 | Last GANC IP address | IP Address 11.2.9 | C | TLV | 7-19 |  |  |
| 98 | Last GANC FQDN | Fully Qualified Domain/Host Name 11.2.10 | C | TLV | 5-258 |  |  |
| 61 | AP Service Name | AP Service Name 11.2.61 | C | TLV | 4-260 |  |  |
| 68 | Registration indicators | Registration Indicators 11.2.68 | C | TLV | 3 |  |  |
| 69 | GAN PLMN List | GAN PLMN List 11.2.69 | C | TLV | n |  |  |

TABLE 10-continued

GA-RC REGISTER REQUEST

| IEI | Information Element | Type/ Reference | Presence | Format | Length | Value | Notes |
|---|---|---|---|---|---|---|---|
| 71 | Required GAN Services | Required GAN Services 11.2.71 | O | TLV | 3 | | |
| 73 | 3G Cell Identity | 3G Cell Identity 11.2.73 | C | TLV | 6 | | |
| 82 | 3G UARFCN | 3G UARFCN 11.2.82 | O | TLV | 4 | | |
| 74 | 3G Security Capability | 3G Security Capability 11.2.111 | C | TLV | 6 | | |
| xxx | PLMN Continuity Request | PLMN Continuity Request 11.2.xxx | O | TLV | 3 | | |

These information element fields may be defined, for example as defined previously for the GA-RC REGISTER UPDATE Uplink message.

Automatic Adjustment of GPCP While in Dedicated Mode

In some embodiments an option is provided whereby anytime the MS is in dedicated mode (that is in an active voice or data session) the GPCP is automatically configured on the MS to "PLMN Continuity Required" for the duration of the active session and then set back to the regular setting when the active session ends. This change in PLMN continuity requirement is communicated to the network, for example, using the methods described herein. In some embodiments, the GPCP is automatically configured to "PLMN Continuity Required" only in the case of a voice call and not in the case of a data session. This captures the assumption that users do not want a dropped voice call but that interruptions in data services may be acceptable.

Network and Mobile Station Behaviour in Response to the GAN PLMN Continuity Preference Various approaches have been described above for communicating GAN PLMN continuity preference information for a MS from the MS to a GANC. Further embodiments relate to the behavior of the GANC in response to such GAN PLMN continuity preference information for cases where the GANC is equipped to process the continuity preference information. Yet further embodiments relate to the behaviour of the MS based on the GAN PLMN continuity preference information. Some embodiments involve new behaviour in the network; some embodiments involve new behaviour in the MS; some embodiments involve new behaviour in both the MS and the network. Note that some of these embodiments are described in concert with the transmission of GAN PLMN Continuity Preference information.

In some cases, the RPLMN that the MS is currently registered with in cellular is available via one or more GANCs and/or an EPLMN is available via one or more GANCs, and embodiments are provided to deal with this. In some cases, the RPLMN that the MS is currently registered with in cellular is not available via any GANC, and no EPLMN is available, and embodiments are provided to deal with this. These embodiments can be independently implemented. Some implementations feature a combination of two or more embodiments to address both scenario types.

Two broad categories of behaviour are described below. The first category involves behaviour when the cellular RPLMN and/or EPLMN is available via one or more GANCs.

The second category of behaviour is when the cellular RPLMN is not available via one or more GANCs, and no EPLMN is available via one or more GANCs.

Behaviour When the Cellular RPLMN or EPLMN is Available via One or More GANCs

When the RPLMN or an EPLMN is available via one or more of the GANCs, a PLMN mismatch can still occur. For example, if the Default GANC (the Default GANC is by definition associated with the HPLMN or EHPLMN) accepts the registration of the MS even though the RPLMN is not the HPLMN or an EHPLMN, there will be a mismatch. A PLMN mismatch may also occur if the Default GANC redirects the MS to an alternate GANC that is not associated with the RPLMN or an EPLMN. A PLMN mismatch may also occur if the Default GANC redirects the MS by providing the GAN PLMN list, where the GAN PLMN list does not contain the RPLMN or an EPLMN.

Two categories of behaviour will be described. In the first, the MS is registered in the cellular network on a RPLMN which is not the HPLMN or an EHPLMN. In the second, the MS is registered in the cellular network on the HPLMN or an EHPLMN. Behaviours are described both for the case where the Default GANC is configured to process the GAN PLMN continuity preference, and the case where the Default GANC is a legacy GANC.

1) The MS is registered in the cellular network on a RPLMN which is not the HPLMN or an EHPLMN (e.g. a VPLMN (Visited PLMN))

When the MS sends a GA-RC REGISTRATION REQUEST message to the Default GAN, it will include the indication of its GAN PLMN Continuity Preference as described above. If the Default GANC supports the PLMN Continuity Request then behaviour is a function of the continuity request as follows:

a. If there is a single available GANC that is associated with the RPLMN of the MS or an equivalent PLMN to the RPLMN of the MS, and the continuity preference is required or preferred, the Default GANC will redirect the MS to that specific GANC using the existing GA-RC_REGISTER_REDIRECT message. This may, for example, be achieved by including a PLMN Mobile Country Code (MCC) and PLMN Mobile Network Code (MNC) of the RPLMN or an equivalent PLMN to the RPLMN in an RC_REGISTER_REDIRECT message.

b. If there is more than one available GANC associated with the RPLMN of the MS and/or one or more available equivalent PLMN to the RPLMN of the MS, and the continuity preference is required or preferred, the Default GANC will send the MS a GA-RC REGISTER REDIRECT message with the GAN PLMN list included, and the GAN PLMN list will contain the GANC-PLMN pairs where the PLMN is the RPLMN or an equivalent PLMN(s). The MS can then proceed to register with a GANC of its choice from the list.

c. If the continuity preference is GANC associated with HPLMN or EHPLMN required, then the Default GANC will accept the registration.

d. If the continuity preference is no preference, then the Default GANC may accept, reject, or redirect the MS, for example as currently described in 3GPP TS 44.318.

If the Default GANC does not support the PLMN Continuity Request (i.e. if it a legacy GANC), then it may do one of three things which are subject to different MS behaviour depending on the GPCP:

a. The Default GANC may accept the registration request message from the MS, even though there is a PLMN mismatch. In this case the MS may exhibit different behaviours depending on its GPCP field.

i. If the MS requires PLMN Continuity and it receives a GA-RC REGISTER ACCEPT message from the Default GANC when the RPLMN is not the HPLMN and is not an EHPLMN, then the MS will ask the Default GANC to send the GAN PLMN list; note at this point, the MS does not know that the desired PLMN will be on the list, but the category of behaviour being described here is for "Behaviour When the Cellular RPLMN or an equivalent PLMN to the Cellular RPLMN is available via one or more GANCs". Once the MS has the list, the MS de-registers from default GANC, and attempts registration with a GANC associated with a PLMN that is the same or equivalent to the Cellular RPLMN.

ii. If the MS prefers PLMN Continuity and it receives a GA-RC REGISTER ACCEPT message from the Default GANC when the RPLMN is not the HPLMN and is not an EHPLMN, then the MS will again ask the Default GANC to send the GAN PLMN list; note at this point, the MS does not know that the desired PLMN will be on the list, but the category of behaviour being described here is for "Behaviour When the Cellular RPLMN or ERPLMN is available via one or more GANCs". Once the MS has the GAN PLMN list, it de-registers with the Default GANC and attempts registration with a GANC that is associated with a PLMN that is the same or equivalent to the cellular RPLMN.

iii. If the MS requires the GANC to be associated with HPLMN, then, since the Default GANC is associated with the HPLMN or EHPLMN, the MS will receive GAN services over the Default GANC or other GANC associated with the HPLMN or EHPLMN.

iv. If the MS has no preference, then the MS will receive GAN services over the Default GANC.

b. The Default GANC may reject the registration request message from the MS. In this case the MS will follow the existing behaviour for Registration Rejected as defined in 3GPP TS 44.318 Section 6.2.3.3.

c. The Default GANC may redirect the MS to another GANC. The RPLMN may or may not be associated with the GANC that the MS is redirected to. The MS behaviour will depend on the GPCP:

i. If the MS requires or prefers PLMN continuity, and the redirect PLMN matches the cellular RPLMN either because the RPLMN or an equivalent PLMN to the cellular RPLMN is associated with the redirected GANC, the MS goes ahead and initiates registration with the redirect GANC and its associated PLMN. If the PLMN associated with the redirect GANC does not match the cellular RPLMN or an equivalent PLMN to the cellular RPLMN, then rather than initiating registration towards the GANC received in the redirect message the MS triggers the Default GANC to send the GAN PLMN list. The MS then initiates registration towards a GANC on the GAN PLMN list that is associated with the cellular RPLMN or with an equivalent PLMN to the cellular RPLMN.

ii. If the MS requires that the GANC be associated with the HPLMN or EHPLMN, then the MS again initiates registration to the Default GANC. If the Default GANC rejects or redirects the MS again, then rove-in or handover in to GAN is not successful. The MS may re-initiate the discovery procedure as defined in 3GPP TS 44.318 Section 5.

iii. If the MS has no preference it will initiate registration towards the GANC received in the redirect message.

d. The Default GANC may redirect the MS to another GANC using the GAN PLMN list. The assumption is that the RPLMN or one or more equivalent PLMNs to the RPLMN will be on the GAN PLMN list since the behaviour being described here is for the general category "Behaviour When the Cellular RPLMN or a PLMN equivalent to the RPLMN is available via one or more GANCs". The MS behaviour will depend on the GPCP:

i. If the MS requires or prefers PLMN continuity it will initiate registration towards a GANC on the GAN PLMN list associated with the cellular RPLMN or with a PLMN equivalent to the cellular RPLMN.

ii. If the MS requires the GANC be associated with the HPLMN or EHPLMN, then the MS will try instead to register again with the Default GANC. If the Default GANC rejects or redirects the MS again, then rove-in or handover in to GAN is not successful. The MS may re-initiate the discovery procedure as defined in 3GPP TS 44.318 Section 5.3.

iii. If the MS has no preference it will initiate registration towards any of the GANC received in the GAN PLMN list.

2) The MS is registered in the cellular network on the HPLMN or an EHPLMN

When the MS sends a GA-RC REGISTRATION REQUEST message to the Default GAN, it will include the indication of its GAN PLMN Continuity Preference as described above. If the Default GANC supports the PLMN Continuity Request it will behave depending on the MS GPCP field:

a. If the MS preference is PLMN Continuity Required or PLMN Continuity Preferred, or GANC associated with HPLMN or EHPLMN required, then the Default GANC accepts the registration request from the MS.

b. If the MS has no preference, then the Default GANC may accept, reject, or redirect the MS, for example as currently described in 3GPP TS 44.318.

If the Default GANC does not support the PLMN Continuity Request (i.e. if it a legacy GANC), then it may do one of four things which are subject to different MS behaviour depending on the GPCP:

a. The Default GANC may accept the registration request of the MS. Then the MS will receive GAN services over the Default GANC, which is the preferred scenario regardless of the setting of the GPCP.

b. The Default GANC may reject the registration request of the MS. In this case the MS can behave as set forth in 3GPP TS 44.318 Section 6.2.3.3.

c. The Default GANC may redirect the MS to another GANC, for example with a REGISTER REDIRECT message containing a single GANC target. The RPLMN (which is the HPLMN or an EHPLMN in this case) may or may not be associated with the GANC that the MS is redirected to. The MS behaviour will depend on the GPCP:
   i. If the MS requires or prefers PLMN continuity, or if the MS requires that the GANC be associated with the HPLMN or EHPLMN, and the PLMN associated with the redirect GANC is the HPLMN or an EHPLMN), then the MS initiates registration with the redirect GANC. If the redirect GANC is associated with a different PLMN (VPLMN) that is not the HPLMN or an EHPLMN, then rather than initiating registration towards the redirect GANC, the MS triggers the Default GANC to send the GAN PLMN list. The MS then initiates registration towards a GANC on the GAN PLMN list associated with the HPLMN or an EHPLMN. If the Default GANC rejects or directs the MS again, then rove-in or handover in to GAN is not successful. The MS may re-initiate the discovery procedure as defined in 3GPP TS 44.318 Section 5.
   ii. If the MS has no preference it will initiate registration towards the GANC received in the redirect message.
d. The Default GANC may redirect the MS to another GANC using the GAN PLMN list. The assumption is that the RPLMN (the HPLMN or an EHPLMN in this case) will be on the GAN PLMN list since the behaviour being described here is for the general category "Behaviour When the Cellular RPLMN or a PLMN equivalent to the RPLMN is available via one or more GANCs". The MS behaviour will depend on the GPCP:
   i. If the MS requires or prefers PLMN continuity or if the MS requires that the GANC be associated with the HPLMN, then it will initiate registration towards a GANC on the GAN PLMN list associated with the HPLMN or an EHPLMN.
   ii. If the MS has no preference it will initiate registration towards any of the GANCs received in the GAN PLMN list.

Behaviour When Neither the Cellular RPLMN nor an Equivalent PLMN to the Cellular PLMN is Available via One or More GANCs When the MS sends a GA-RC REGISTRATION REQUEST message to the Default GANC, it will include the indication of its GAN PLMN Continuity Preference as described above. If the Default GANC supports the PLMN Continuity Request, behaviour of the Default GANC will be dependent on the GAN PLMN Continuity Preference:
   i) if the continuity preference is required, it will reject the registration, but send the MS a GAN PLMN list so that the MS can attempt to register with a different Cellular PLMN for which there is an associated GANC as described below.
   ii) if the continuity preference is preferred, it will reject the registration, but send the MS a GAN PLMN list so that the MS can attempt to register with a different Cellular PLMN for which there is an associated GANC as described below. Eventually, if a cellular PLMN with an associated GANC is not found, the MS may proceed with registering with a GANC to obtain GAN services even though the PLMN associated with the registered GANC does not match or is not equivalent to the cellular RPLMN.
   iii) if the continuity preference is GANC associated with HPLMN or EHPLMN required, the Default GANC will accept the registration;
   iv) if the continuity preference is no preference, the Default GANC may accept the registration or redirect the MS to a different GANC.

If the Default GANC does not support the PLMN Continuity Request (i.e. if it a legacy GANC), then the Default GANC may do one of four things which are subject to different MS behaviour depending on the GPCP:
   a. The Default GANC may accept the registration request message from the MS, even though there is a PLMN mismatch. In this case the MS may exhibit different behaviours depending on its GPCP field.
      i. If the MS Requires PLMN Continuity and it receives a GA-RC REGISTER ACCEPT message from the Default GANC when the RPLMN is not the HPLMN and is not an EHPLMN, then the MS will trigger the Default GANC to send the GAN PLMN list; note at this point, the MS does not know that the desired PLMN is not on the list, but the category of behaviour being described here is for "Behaviour When Neither the Cellular RPLMN nor an equivalent PLMN is available via one or more GANCs". Once the MS has the list, the MS becomes aware that it is not able to register with a GANC associated with the Cellular RPLMN or or an equivalent PLMN. It then attempts to register with a cellular PLMN that allows for a PLMN match to be achieved, as described below. If attempts to register with a cellular PLMN that allows for a PLMN match is not achieved, then rove-in or handover in to GAN has failed. The MS may re-initiate the discovery procedure as defined in 3GPP TS 44.318 Section 5.
      ii. If the MS Prefers PLMN Continuity and it receives a GA-RC REGISTER ACCEPT message from the Default GANC when the RPLMN is not the HPLMN or an EHPLMN, then the MS will trigger the Default GANC to send the GAN PLMN list; note at this point, the MS does not know that the desired PLMN will not be on the list, but the category of behaviour being described here is for "Behaviour When Neither the Cellular RPLMN nor an equivalent PLMN is available via one or more GANCs". Once the MS has the GAN PLMN list, the MS becomes aware that it is not able to register with a GANC associated with the Cellular RPLMN or an equivalent PLMN. It then attempts to register with a cellular PLMN that allows for a PLMN match to be achieved, as described below. If attempts to register with a cellular PLMN to achieve a PLMN match with a PLMN associated with an available GANC fail, the MS may proceed with accepting GAN services through a GANC for which there is no PLMN match.
      iii. If the MS requires the GANC to be associated with HPLMN or an EHPLMN, then the MS will receive GAN services over the Default GANC.
      iv. If the MS has no preference, then the MS will receive GAN services over the Default GANC.
   b. The Default GANC may reject the registration request message from the MS. In this case the MS will follow the existing behaviour for Registration Rejected as defined in 3GPP TS 44.318 Section 6.2.3.3.
   c. The Default GANC may redirect the MS to another GANC using a registration redirect message. The MS behaviour will depend on the GPCP:
      i. The PLMN associated with the redirect GANC does not match the cellular RPLMN or a PLMN equivalent to the cellular RPLMN, and as such, if the MS requires PLMN continuity, then rather than initiating registration towards the GANC received in the redirect message the MS triggers the Default GANC to send the GAN PLMN list. The MS then attempts to register with a different Cellular PLMN that allows for a PLMN match to be achieved, as detailed below. If attempts to register with a cellular PLMN that allows for a PLMN match is not achieved, then rove-in or handover in to GAN has failed. The MS may re-initiate the discovery procedure as defined in 3GPP TS 44.318 Section 5.

ii. If the MS prefers PLMN continuity, the MS triggers the Default GANC to send the GAN PLMN list. The MS then attempts to register with a different Cellular PLMN that allows for a PLMN match to be achieved, as detailed below. If the MS is unable to register with a different cellular PLMN such that a PLMN match may be achieved, then the MS may proceed with accepting GAN services through the redirect GANC even though there is no PLMN match.

iii. If the MS requires that the GANC be associated with the HPLMN or EHPLMN, then the MS re-attempts registration with the Default GANC. If the Default GANC rejects or redirects the MS again, then rove-in or handover in to GAN is not successful. The MS may re-initiate the discovery procedure as defined in 3GPP TS 44.318 Section 5.

iv. If the MS has no preference it will initiate registration towards the GANC received in the redirect message.

d. The Default GANC may redirect the MS to another GANC using the GAN PLMN list. The assumption is that the Cellular RPLMN will not be on the GAN PLMN list since the behaviour being described here is for the general category "Behaviour When Neither the Cellular RPLMN nor an equivalent PLMN is available via one or more GANCs". The MS behaviour will depend on the GPCP:

i. If the MS requires PLMN continuity, it will attempt to register with a different Cellular PLMN that allows for a PLMN match to be achieved, as detailed below. If attempts to register with a cellular PLMN that allows for a PLMN match is not achieved, then rove-in or handover in to GAN has failed. The MS may re-initiate the discovery procedure as defined in 3GPP TS 44.318 Section 5.

ii. If the MS prefers PLMN continuity, it will attempt to register with a different Cellular PLMN that allows for a PLMN match to be achieved, as detailed below. If attempts to register with a cellular PLMN to achieve a PLMN match with GANC fail, the MS may proceed with accepting GAN services through a GANC for which there is no PLMN match.

iii. If the MS requires that the GANC be associated with the HPLMN or EHPLMN, then the MS re-attempts registration with the Default GANC. If attempts to register with a cellular PLMN that allows for a PLMN match is not achieved, then rove-in or handover in to GAN has failed. The MS may re-initiate the discovery procedure as defined in 3GPP TS 44.318 Section 5.

iv. If the MS has no preference it will initiate registration towards any of the GANC received in the GAN PLMN list.

Further Embodiments

Figure 2:
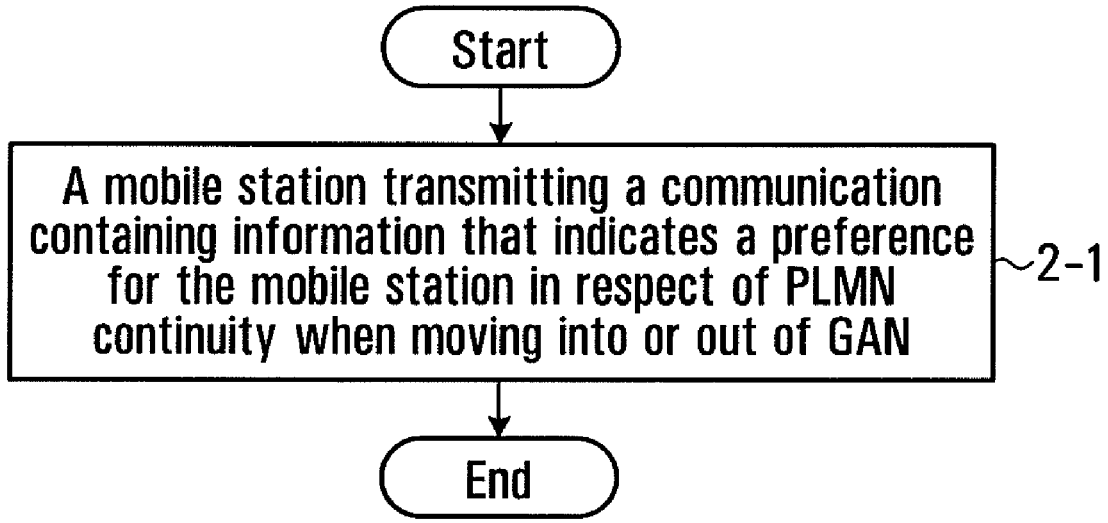
FIG. 2 is a flowchart of a method for MSs to transmit PLMN continuity preference information.

FIG. 2 is a flowchart of a method executed by a MS. The method involves, at block 2-1, a MS transmitting a communication that indicates a preference for the MS in respect of PLMN continuity when roving into or out of GAN or handing over into or out of GAN. In some embodiments, the information indicates a preference for PLMN continuity from a set of possible preferences, the set comprising at least two of, or all of: PLMN continuity required; PLMN continuity preferred; GANC associated with HPLMN or an EHPLMN required; No preference.

Figure 3:
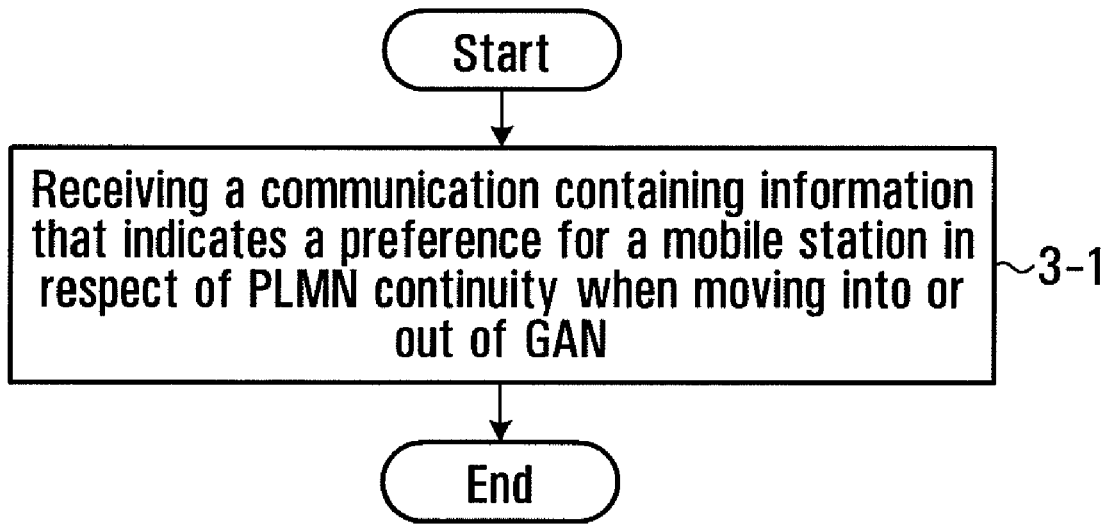
FIG. 3 is a flowchart of a method of a GANC to receive GAN PLMN continuity preference information.

FIG. 3 is a flowchart of a method executed by a GANC. The method involves, at block 3-1, receiving signalling information that indicates a preference for a MS in respect of PLMN continuity when roving into or out of GAN or handing over into or out of GAN.

Figure 4:
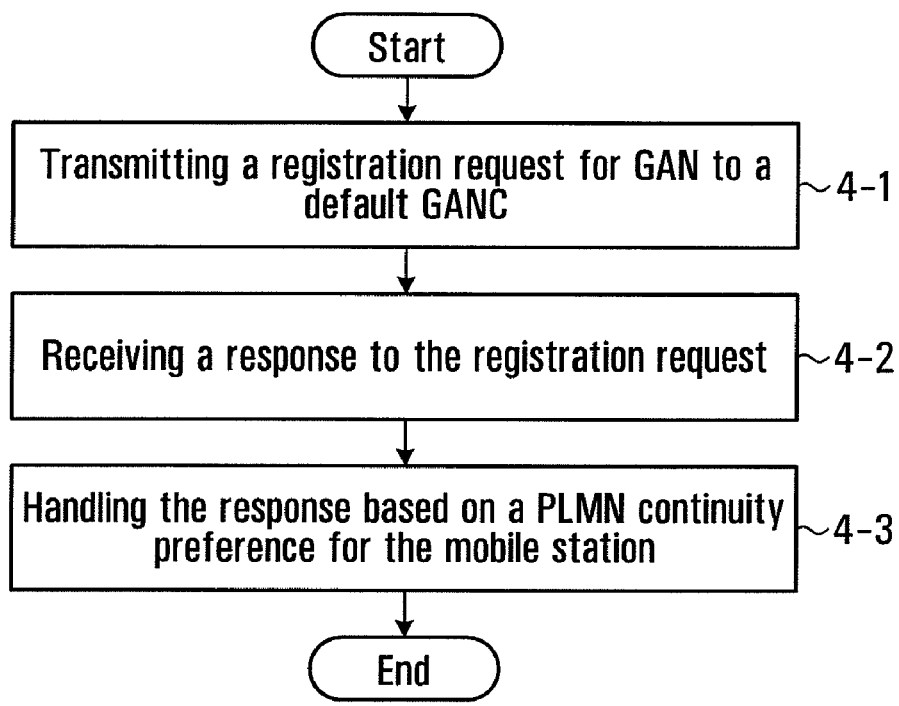
FIG. 4 is flowchart of a method of moving into GAN based on GAN PLMN continuity preference information.

FIG. 4 is a flowchart of another method executed by a MS. The method involves, at block 4-1, transmitting a registration request for GAN to a default GANC. At block 4-2, the MS receives a response to the registration request. At block 4-3, the MS handles the response based on a PLMN continuity preference for the MS.

In some embodiments, receiving a response to the registration request comprises receiving an acceptance of the registration request by a GANC that is not associated with the cellular PLMN, and wherein handling the response based on the PLMN continuity preference for the MS comprises at least one of:

for a continuity preference of PLMN continuity required:
    a) requesting a GAN PLMN list;
    b) attempting to register with another GANC on the GAN PLMN list that is associated with a PLMN matching or equivalent to the cellular PLMN.

for a continuity preference of PLMN continuity preferred:
    a) requesting a GAN PLMN list;
    b) attempting to register with another GANC on the GAN PLMN list that is associated with a PLMN matching or equivalent to the cellular PLMN, and ultimately if a PLMN match is not achieved accepting GAN services through a GANC for which there is no PLMN match.

for a continuity preference of GANC associated with HPLMN or EHPLMN required:
    a) receiving GAN services through the GANC if the GANC is associated with the HPLMN or EHPLMN;
    b) if the GANC is not associated with the HPLMN or an EHPLMN, attempting to register with a GANC associated with the HPLMN or an EHPLMN;

for a continuity preference of no preference:
    a) receiving GAN services through the GANC.

In some embodiments, receiving a response to the registration request comprises receiving a registration redirect to a single GANC that is associated with the cellular PLMN, and wherein handling the response based on the PLMN continuity preference for the MS comprises at least one of:

for a continuity preference of PLMN continuity required:
    a) registering with the single GANC and receiving GAN services through the single GANC;

for a continuity preference of PLMN continuity preferred:
    a) registering with the single GANC and receiving GAN services through the single GANC;

for a continuity preference of GANC associated with HPLMN or EHPLMN required:
    a) registering with the single GANC and receiving GAN services through the single GANC if the GANC is associated with the HPLMN or an EHPLMN;
    b) if the single GANC is not associated with the HPLMN or an EHPLMN, attempting to register with a GANC associated with the HPLMN or an EHPLMN;

for a continuity preference of no preference:
    a) registering with the single GANC and receiving GAN services through the GANC.

In some embodiments, receiving a response to the registration request comprises receiving a registration redirect to a single GANC that is not associated with the cellular RPLMN or a PLMN equivalent to the cellular PLMN.

In this case, handling the response based on the PLMN continuity preference for the MS comprises at least one of:

for a continuity preference of PLMN continuity required:
a) requesting a GAN PLMN list;
b) attempting to register with another GANC on the GAN PLMN list that is associated with the RPLMN or a PLMN equivalent to the cellular PLMN;

for a continuity preference of PLMN continuity preferred:
a) requesting a GAN PLMN list;
b) attempting to register with another GANC on the GAN PLMN list that is associated with a PLMN matching the RPLMN or a PLMN equivalent to the cellular PLMN, and ultimately if a PLMN match is not achieved accepting GAN services through a GANC for which there is no PLMN match.

for a continuity preference of GANC associated with HPLMN or EHPLMN required:
a) if the single GANC is associated with the HPLMN or an EHPLMN, registering with the single GANC;
b) if the single GANC is not associated with the HPLMN or an EHPLMN, requesting the GAN PLMN list and attempting to register with a GANC associated with the HPLMN or an EHPLMN;

for a continuity preference of no preference:
a) registering with the single GANC.

In some embodiments, receiving a response to the registration request comprises receiving a GAN PLMN list containing at least one GANC that is associated with the RPLMN or a PLMN equivalent to the cellular PLMN, and wherein handling the response based on the PLMN continuity preference for the MS comprises at least one of:

for a continuity preference of PLMN continuity required:
a) registering with a GANC on the GAN PLMN list associated with the RPLMN or a PLMN equivalent to the cellular PLMN and receiving GAN services through that GANC;

for a continuity preference of PLMN continuity preferred:
a) registering with a GANC on the GAN PLMN list associated with the RPLMN or a PLMN equivalent to the cellular PLMN and receiving GAN services through that GANC for a continuity preference of GANC associated with HPLMN or EHPLMN required:
attempting to register with a GANC that is associated with the HPLMN or an EHPLMN;

for a continuity preference of no preference:
a) registering with a GANC on the GAN PLMN list and receiving GAN services through the GANC.

In some embodiments, receiving a response to the registration request comprises receiving a GAN PLMN list containing no GANC that is associated with the RPLMN or a PLMN equivalent to the cellular PLMN, and wherein handling the response based on the PLMN continuity preference for the MS comprises at least one of:

for a continuity preference of PLMN continuity required:
a) attempting to register with a different cellular PLMN for which a PLMN match can be achieved as determined from the GAN PLMN list, where such a PLMN match is possible;
b) if successful, registering with a GANC associated with the different cellular PLMN or a PLMN equivalent to the different cellular PLMN;

for a continuity preference of PLMN continuity preferred:
a) attempting to register with a different cellular PLMN for which a PLMN match can be achieved as determined from the GAN PLMN list, where such a PLMN match is possible, and registering with a GANC associated with the different cellular PLMN;
b) where no PLMN match is possible by changing the registered cellular PLMN, registering with a GANC for which there is no PLMN match;

for a continuity preference of GANC associated with HPLMN or EHPLMN required:
attempting to register with the GANC is associated with the HPLMN or an EHPLMN; If the MS is not registered with the HPLM or EHPLMN in cellular, the MS goes back to the cellular network and tries to register on the HPLMN or an EHPLMN.

for a continuity preference of no preference:
a) registering with one of the GANC on the GAN PLMN list.

Figure 5:
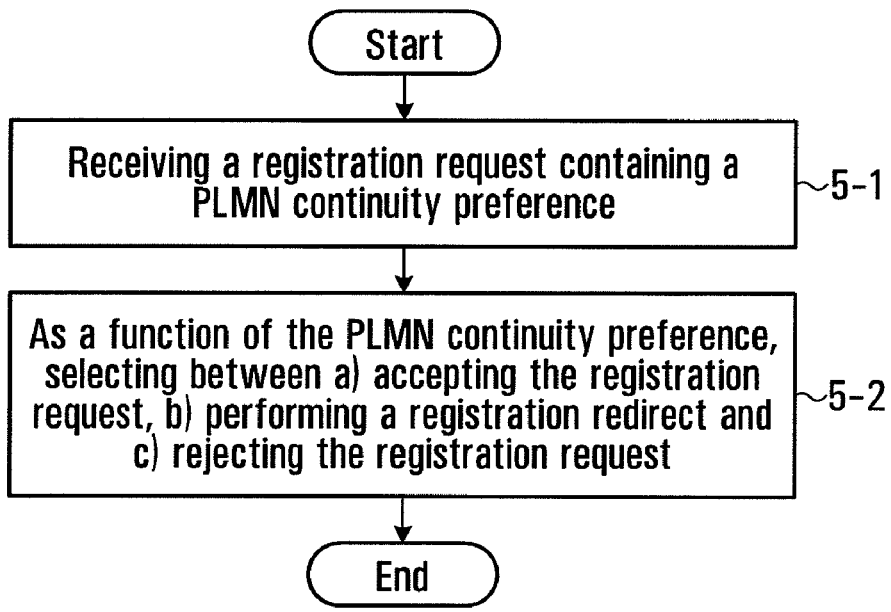
FIG. 5 is a flowchart of a method for a GANC to process registration requests having regard to GAN PLMN continuity preference information.

FIG. 5 is a flowchart for execution by a GANC. The method involves, at block 5-1, receiving a registration request containing a PLMN continuity preference. In block 5-2, the GANC, as a function of the PLMN continuity preference, selects between a) accepting the registration request b) performing a registration redirect, and c) rejecting the registration request.

In some embodiments, as a function of the PLMN continuity preference, selecting between a) accepting the registration request b) performing a registration redirect and c) rejecting the registration request comprises, for a PLMN continuity preference of PLMN continuity required:
accepting the registration if the GANC is associated with a PLMN matching a current RPLMN or a PLMN equivalent to the cellular PLMN;
if the GANC is not associated with a PLMN matching the RPLMN or a PLMN equivalent to the cellular PLMN, performing at least one of:
a) redirecting to a GANC associated with a PLMN matching the current RPLMN or a PLMN equivalent to the cellular PLMN;
b) sending a GAN PLMN list containing at least one GANC associated with the RPLMN or a PLMN equivalent to the cellular PLMN;
c) sending a GAN PLMN list so as to allow the MS to perform cellular PLMN re-selection.

In some embodiments, as a function of the PLMN continuity preference, selecting between a) accepting the registration request and b) performing a registration redirect and c) rejecting the registration request comprises, for a PLMN continuity preference of PLMN continuity preferred:
accepting the registration if the GANC is associated with a PLMN matching a current RPLMN or a PLMN equivalent to the cellular PLMN;
if the GANC is not associated with a PLMN matching the RPLMN or a PLMN equivalent to the cellular PLMN performing at least one of:
a) redirecting to a GANC associated with a PLMN matching the RPLMN or a PLMN equivalent to the cellular PLMN;
b) sending a GAN PLMN list containing at least one GANC associated with the RPLMN or a PLMN equivalent to the cellular PLMN;
c) sending a GAN PLMN list so as to allow the MS to perform cellular PLMN re-selection in order to achieve a match;
d) accepting the registration despite a resulting PLMN mismatch.

In some embodiments, as a function of the PLMN continuity preference, selecting between a) accepting the registration request and b) performing a registration redirect and c) rejecting the registration request comprises, for a PLMN continuity preference of GANC associated with HPLMN or EHPLMN required:
a) accepting the registration if the GANC is a default GANC associated with the HPLMN or EHPLMN;
b) Redirecting to a GANC associated with the HPLMN or EHPLMN;

c) sending a GAN PLMN list so as to allow the MS to select a GANC that is associated with the HPLMN or an EHPLMN Continuity Support Indication In the embodiments described above, there is not necessarily any explicit signalling that indicates that a GANC has understood the PLMN Continuity Request field (whether in a new IE or included as part of the GAN Required Services IE). Therefore if the GANC does not seem to behave according to the transmitted continuity request, the MS may not know if this is because the GANC did not recognize it (i.e. in the case of a legacy GANC that does not support this message) or if it is because the RPLMN (cellular) is not available via GAN.

In another embodiment, explicit signalling that indicates that a GANC understands the PLMN continuity request field is transmitted. Of course, only a GANC that actually understands the field will be able to transmit the explicit signalling.

The signalling might, for example, be part of the GA-RC REGISTER ACCEPT, REJECT, and/or REDIRECT messages.

The table below provides an example of how the support indication might be included within the accept message by way of example (excerpt from 3GPP TS 44.318 with amendment for support indication). Specifically, the definition of the GA-RC Register Accept message content is amended to include a PLMN Continuity Request support indicator IE. The GANC provides system information to the MS using this message. The contents of this message are a collection of IEs from system information 3 and 13 of GERAN specifications plus some additions and is transmitted from GANC to MS.

TABLE

| | | | | | | | |
|---|---|---|---|---|---|---|---|
| IEI | Information Element | Type/Reference | Presence | Format | Length | Value | Notes |
| | Length Indicator | Length Indicator 11.1.1.1 | M | V | 2 | | |
| | GA-RC Protocol Discriminator | Protocol Discriminator 11.1.1.2 | M | V | ½ | 0000 | |
| | Skip Indicator | Skip Indicator 11.1.1.3 | M | V | ½ | 0000 | |
| | GA-RC REGISTER ACCEPT message identity | Message Type 11.1.1.4 | M | V | 1 | | |
| 4 | Cell Identity | Cell Identity 11.2.4 | M | TLV | 4 | | |
| 5 | Location Area Identification | Location Area Identification 11.2.5 | M | TLV | 7 | | |
| 14 | GANC Control Channel Description | GAN Control Channel Description 11.2.14 | M | TLV | 8 | | |
| 23 | TU3910 Timer | TU3910 Timer 11.2.23 | M | TLV | 4 | | |
| 22 | TU3906 Timer | TU3906 Timer 11.2.22 | M | TLV | 4 | | |
| 19 | GAN Band | GAN Band 11.2.19 | M | TLV | 3 | | |
| 37 | TU3920 Timer | TU3920 Timer 11.2.37 | M | TLV | 4 | | |
| 13 | GANC Cell Description | GAN Cell Description 11.2.13 | O | TLV | 4 | | |
| 43 | TU4001 Timer | TU4001 Timer 11.2.43 | C | TLV | 4 | | |
| 60 | TU4003 Timer | TU4003 Timer 11.2.60 | C | TLV | 4 | | |
| 44 | Location Status | Location Status 11.2.44 | O | TLV | 3 | | |
| 62 | GAN Service Zone Information | GAN Service Zone Information 11.2.62 | O | TLV | 5-36 | | |
| 67 | Serving GANC table indicator | Serving GANC table indicator 11.2.67 | O | TLV | 3 | | |
| 112 | TU4004 Timer | TU4004 Timer 11.2.78 | C | TLV | 3 | | |
| xxx | PLMN Continuity Request support indicator | PLMN CR support indicator 11.2.xxx | O | TLV | 3 | | |

The PLMN Continuity Request support indicator IE can, for example, be defined as in the table below. This information element is used to indicate whether or not the GANC supports the PLMN Continuity Request signaling from the MS.

TABLE

| PLMN CR support indicator | | | | | | | | |
|---|---|---|---|---|---|---|---|---|
| 8 | 7 | 6 | 5 | 4 | 3 | 2 | 1 | |
| PLMN Continuity Request Support Indicator IEI | | | | | | | | octet 1 |
| Length of PLMN Continuity Request Support Indicator IE contents | | | | | | | | octet 2 |
| Spare | | | | | | | CRSI | octet 3 |

In the above, the CRSI field might, for example, be defined as in the table below.

| CRSI, Continuity Request Support Indicator (octet 3) | | | |
|---|---|---|---|
| Bits | | | |
| 3 | 2 | 1 | |
| 0 | 0 | 1 | Continuity Request Received and Acknowledged Continuity Request Received and Ignored Other fields for future use |

Switching Cellular RPLMN to Achieve PLMN Match

As described above, there are various circumstances where the MS becomes aware that the RPLMN or a PLMN equivalent to the cellular PLMN is not available via one or more GANCs. In some embodiments the MS initiates a switch in the Cellular RPLMN to one that allows for a PLMN match to be achieved. The MS behaviour will depend on the GPCP.

a. If the MS requires PLMN continuity, then the MS will go back to the cellular network and try to register on another PLMN. It will do this using knowledge of the PLMNs available via GAN that it has obtained from the GAN PLMN list. If the MS is unable to register on a PLMN in cellular which is also available via GAN, then the MS rove-in or handover in to GAN is unsuccessful.

b. If the MS prefers PLMN continuity, the MS will go back to the cellular network and try to register on another PLMN. It will do this using knowledge of the PLMNs available via GAN that it has obtained from the GAN PLMN list. If the MS is unable to register on a PLMN in cellular that is also available via GAN, then the MS will select a GANC-PLMN pair from the GAN PLMN list according to the procedures defined in 3GPP TS 43.318 and TS 44.318. The MS may, for example, change its continuity preference in the registration message to achieve this.

c. If the MS requires the GANC be associated with the HPLMN or an EHPLMN, then the MS will try to re-select to the HPLMN or an EHPLMN in cellular. If it is unable to do so then the MS rove-in or handover in to GAN is unsuccessful.

d. If the MS has no preference, then the MS need not be concerned that the RPLMN is not associated with any GANC.

Figure 6:
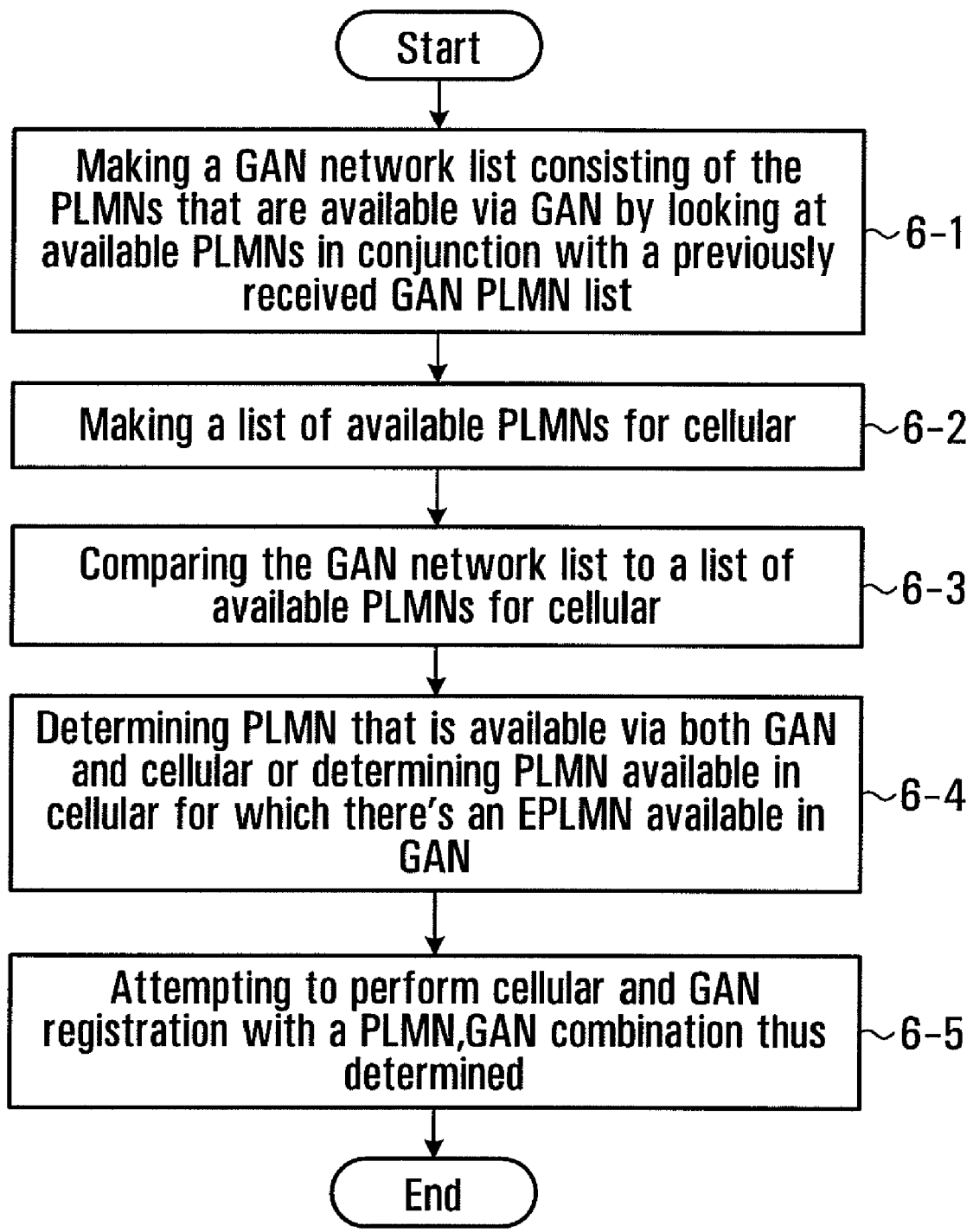
FIG. 6 is a flowchart of a method of achieving PLMN continuity.

A method of achieving PLMN continuity for this case will now be described with reference to FIG. 6. In block 6-1 the MS makes a network list consisting of the PLMNs that are available via GAN (i.e. those that were received in the GAN PLMN list.). In block 6-2, the MS makes a list of available PLMNs for cellular. In block 6-3, the MS compares the network list from GAN with the list of available PLMNs for cellular. In block 6-4, the MS determines a PLMN that is available (i.e. common) via both GAN and cellular, or determining a PLMN available in cellular for which there is an EPLMN available in GAN. In block 6-5, the MS attempts to perform cellular and GAN registration with a PLMN, GANC and a combination thus determined. In some embodiments, this involves sorting the list of common networks according to the prioritization for automatic network selection (i.e. the $EF_{OPLMNwACT}$), and trying to register with the highest priority PLMN that is on the list of common networks (via LAU, RAU, TAU or another mechanism as appropriate). If this registration fails, then the MS attempts to register on the next highest priority PLMN in the list of common networks, and continues until successful or all the common networks have been tried. If the process is successful, then using the GAN PLMN list sent from the Default GANC, the MS attempts to register on a GANC that is associated with the new cellular PLMN. If the process is unsuccessful, then there is no PLMN that can be found that is common to both cellular and GAN. The MS may, for example, continue GANC selection as per 3GPP TS 44.318.

In some embodiments, the network selection process may, for example, be driven by an operator's preferred PLMN list for cellular network selection, for example the contents of an Elementary File (EF) containing an operator's preferred PLMN list. This file is the $EF_{OPLMNwACT}$ (see 3GPP TS 31.102 section 4.2.53) and it is stored on the USIM. The order of the contents of this list is typically used to determine the selection of the PLMN. In some embodiments, if an operator is seeking to ensure PLMN continuity with GAN, then they provision the preferred PLMN list, for example the $EF_{OPLMNwACT}$ list, such that networks which also support GAN are prioritized, for example above those that do not support GAN. The preferred PLMN list is sorted by the operator and stored on the mobile device either during device provisioning, or through over the air provisioning, or may be communicated to the MS using other methods. In some embodiments, PLMN list prioritized according to GAN support is further sorted in conjunction with other prioritization preferences, such as but not limited to the networks for roaming that are best suited to voice.

If however the MS utilizes the PLMN continuity preference indication, and it is set to indicate "required" or "preferred", then the MS may be permitted to only consider the subset of the $EF_{OPLMNwACT}$ that contains the networks that support GAN, which it is aware of from the GAN PLMN List which has be received from the Default GANC.

Therefore once the MS detects that its cellular PLMN is not in the GAN PLMN list and no equivalent PLMN is on the list, the MS attempts to select a different PLMN in cellular using the PLMNs from the GAN PLMN list as the list of PLMNs sent to the NAS function as part of the PLMN selection process. Trying to re-select the PLMN in cellular before registering on the GAN will ensure that every possible attempt is made to align the PLMNs. It may happen that it is not possible to re-select a PLMN in cellular that is part of the GAN PLMN list (due to operator policies, unavailability, etc.). In this case the MS may stay registered on the current RPLMN and go back to the GANC Selection Process to choose a GANC-PLMN pair from the list sent by the Default GANC.

The above-describe embodiment is also applicable for maintaining PLMN continuity between a first network type and a second network type. The corresponding method involves making a network list consisting of the PLMNs that are available via a second network type by looking at available PLMNs in conjunction with a previously received PLMN list; making a list of available PLMNs for a first network type; comparing the network list to a list of available PLMNs for the first network type; determining a common PLMN that is available via both the first network type and the second network type or determining a PLMN available in the first network type for which there is an EPLMN available in the second network type; attempting to perform registration in the first network type and the second network type with the common PLMN, or the PLMN, equivalent PLMN combination thus determined.

Network Prioritization by Operator

The above-described embodiment provided details of network priorization by the operator, in the context of the use of the GPCP. More generally, an embodiment of the application provides for network prioritization so as to enhance the likelihood of achieving PLMN continuity, without necessarily also using the GPCP.

More generally, in some embodiments the network transmits, and the MS receives, information from the network containing network prioritization information, the prioritization information prioritizing networks such that networks for which PLMN continuity is possible are prioritized above networks for which PLMN continuity is not possible.

Network Prioritization by User/Mobile Station

The above-described embodiment involves the network determining a PLMN list for increased likelihood of PLMN continuity. This can be referred to as "operator controlled PLMN selection". In another embodiment user controlled PLMN selection is provided. In this embodiment, a user preferred PLMN list, for example stored as an EF in memory on the MS, is employed to similar effect. The user defined list is updated by the MS as the MS learns which PLMNS are supported via GAN, i.e. upon receiving the GAN PLMN list. This method is not dependent on the GPCP.

In operation, as the MS tries to move into GAN, the MS obtains the GAN PLMN list somehow, then updates the user preferred PLMN list stored in memory by sorting the PLMNs according to those that offer GAN service. The MS then performs PLMN selection based on the list.

More generally, over time, the MS learns which PLMNs support both a first network type and a second network type, and prioritizes such PLMNs above others. The MS then performs PLMN selection based on the prioritization.

Sections in 3GPP TS 31.102 define EFs (i.e. section 5.3.6 for the $EF_{PLMNwACT}$, and section 5.3.20 for the $EF_{OPLMNwACT}$, Section 4.2.54 for the $EF_{HPLMNwAcT}$) for network or user prioritization.

These EFs contains the coding for n PLMNs where n is determined by the operator. This information is determined by the user ($EF_{PLMNwACT}$) or the operator ($EF_{OPLMNwACT}$, $EF_{HPLMNwAcT}$) and defines the preferred PLMNs in priority order. The first record indicates the highest priority and the $n^{th}$ record indicates the lowest. The EFs also contain the Access Technologies for each PLMN in the list. (see 3GPP TS 23.122)

| Identifier: '6F61' SFI: '11' File size: 5n bytes, (n ≥ 8) | Structure: transparent | Optional Update activity: low |
|---|---|---|

| Access Conditions: | |
|---|---|
| READ | PIN |
| UPDATE | ADM |
| DEACTIVATE | ADM |
| ACTIVATE | ADM |

| Bytes | Description | M/O | Length |
|---|---|---|---|
| 1 to 3 | 1st PLMN (highest priority) | M | 3 bytes |
| 4 to 5 | 1st PLMN Access Technology Identifier | M | 2 bytes |
| . | . | . | . |
| . | . | . | . |
| . | . | . | . |
| 36 to 38 | 8th PLMN | M | 3 bytes |
| 39 to 40 | 8th PLMN Access Technology Identifier | M | 2 bytes |
| 41 to 43 | 9th PLMN | O | 3 bytes |
| 44 to 45 | 9th PLMN Access Technology Identifier | O | 2 bytes |
| . | . | . | . |
| . | . | . | . |
| . | . | . | . |
| (5n − 4) to (5n − 2) | Nth PLMN (lowest priority) | O | 3 bytes |
| (5n − 1) to 5n | Nth PLMN Access Technology Identifier | O | 2 bytes |

The HPLMN Selector with access technology data field shall contain the HPLMN code, or codes together with the respected access technology in priority order (see 3GPP TS 23.122).

PLMN
Contents:
  Mobile Country Code (MCC) followed by the Mobile Network Code (MNC).
Coding:
  according to 3GPP TS 24.008.

Register Update Contains PLMN Continuity Information

The above-described behaviour has focussed on the case where the PLMN continuity preference information is included in the Registration Request. In some embodiments, the MS does not include the PLMN continuity information in a registration request to a Default GANC and/or the MS includes this information but the Default GANC does not take it into account, and in response to that the MS may send a registration update message containing the PLMN continuity information. Registration is accepted by the Default GANC even though a PLMN mismatch exists. In response to this, the MS detects the existence of a PLMN mismatch and the MS sends a REGISTER UPDATE message to request that the current Serving GANC (which is the Default GANC in this case) send the GAN PLMN list.

In some embodiments, the MS signals GAN PLMN continuity preference to the Serving GANC upon detecting the PLMN mismatch, for example as part of the REGISTER UPDATE message. This may, for example involve including one of the optional information elements for the Required GAN Services IE or the PLMN Continuity IE as described previously.

Application to Networks Other than Cellular and WLAN

The embodiments described above all refer to WLAN access points, and to the movement between cellular and GAN. More generally, embodiments are applicable for moving between a network having a first network type, and a network having a second network type that is different from the first network type. A non-limiting set of examples of network types include GSM, UTRAN, E-UTRAN or EPS, WLAN, WiMAX, WiBRO, UMB, etc. In some embodiments, the first network type is one that provides cellular connectivity, and the second network type is one that provides wireless IP connectivity.

Figure 8:
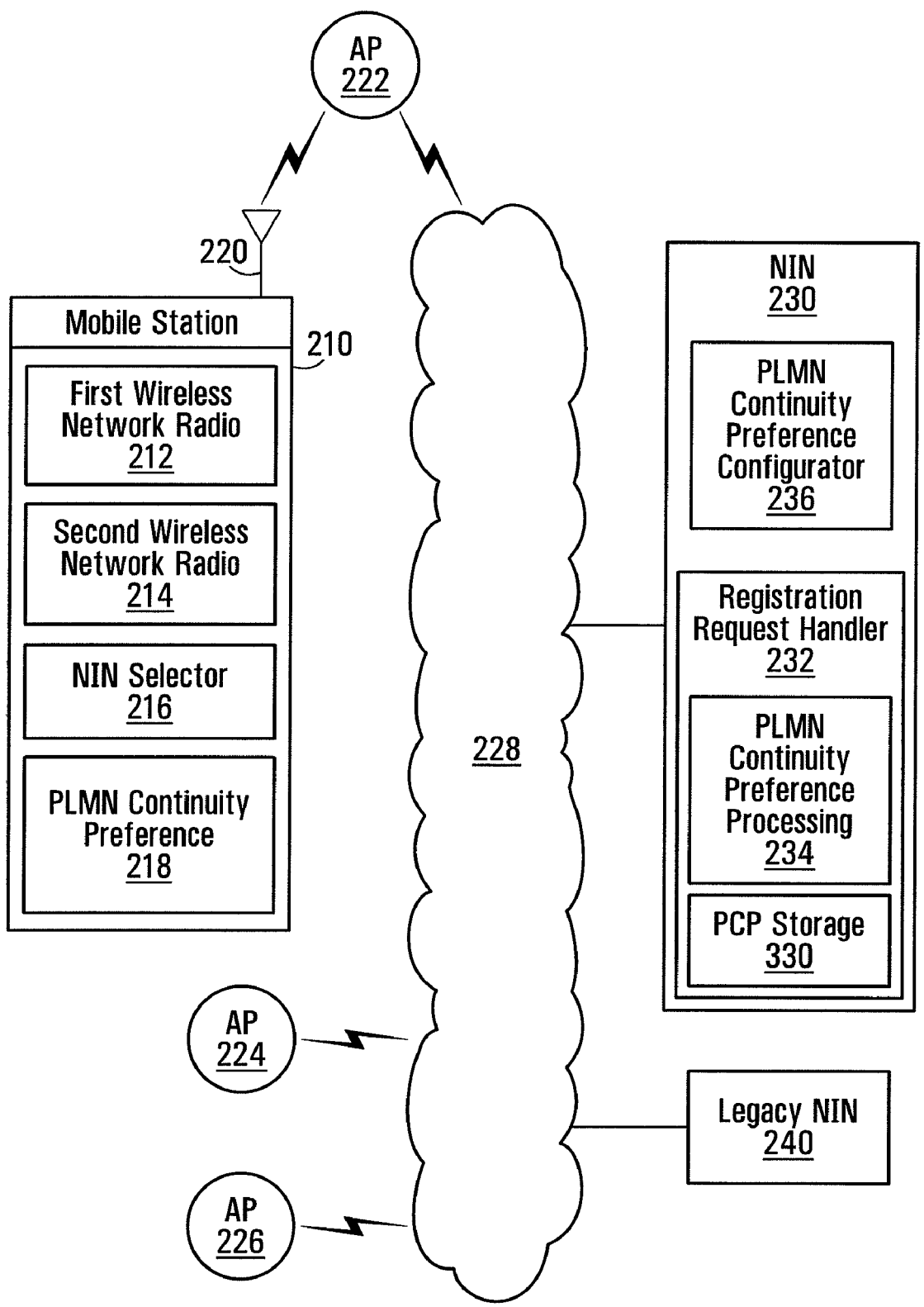
FIG. 8 is a network diagram depicting an example access scenario.

Referring now to FIG. 8, shown is a network diagram depicting an example access scenario. Shown is a MS 210, a plurality of access points (AP) 222,224,226, a network cloud 228, a Network Interworking Node (NIN) 230, and a legacy NIN 240. Each NIN 230,240 is responsible for coordinating the interworking between a network of the first type and a network of a second type. A GANC is a specific example of a NIN that is particular to the GAN-Cellular interworking case. At the instant depicted, the MS 210 has wireless connectivity to access point 222. More generally, the discussion presented herein applies to access scenarios in which there are any number of MSs, any number of access points, and any number of NINs. Network cloud 228 represents any network connectivity between the access points 222,224,226 and the network interworking nodes 230,240. This may for example include parts of the public Internet and or private networks.

The MS 210 has a first wireless network radio 212 through which communication takes place with a network of the first network type. The MS 210 has a second wireless network radio 214 for connecting to a network of the second network type. The MS 210 has a NIN selector 216 responsible for deciding if and when to attempt to register with a network having the second network type, and for deciding which NIN to register with. More generally, a network selector can be provided which selects appropriate network(s). In the embodiments describe, this involves NIN selection, but this need not be the case. The MS has a PLMN continuity preference storage element 218 for storing a PLMN continuity preference (PCP). Note that the GPCP is a specific example of the PCP. The PCP is conceptually the same as the GPCP described previously, but is now applicable for the preference in maintaining continuity when moving between networks of two different types that need not be GAN and cellular. The preference can be stored in any suitable form; specific examples include a token or an identifier. This storage element can be in internal or external memory of any appropriate form.

NIN 230 is a GANC that is configured to recognize the PLMN continuity preference information when received from a MS such as MS 210. The NIN 230 has a registration request handler 232 responsible for processing registration requests. The registration request handler 232 has a PLMN continuity preference processing function 234 which takes into account a PLMN continuity preference received from a MS. In some embodiments, the GANC 230 also includes a PLMN continuity preference configurator 236 for configuring the PLMN continuity preference on a MS. In some embodiments, the NIN 30 also includes storage 238 for storing the PCP of MSs. This might be for the purpose of configuring the PCP of MSs in which case the PCP sends this information to the MS. In another example, the PCP storage 238 is for storing the PCP received from an MS, for example in association with an IP address or other identifier of the MS.

Legacy NIN 240 is a NIN which is not configured to recognize the PLMN continuity preference information.

Some embodiments provide a mechanism for the MS to send the PLMN continuity preference to a NIN, and for a NIN such as NIN 230 to receive the PLMN continuity preference information. Some embodiments provide mechanisms for a NIN such as NIN 230 to make use of such PLMN continuity preference information, and some embodiments provide mechanisms for a MS such as MS 210 to make use of the PLMN continuity preference information.

PLMN Continuity Preference Indication

A mechanism is provided that allows the MS to be able to communicate to the network whether or not it requires or would prefer to maintain PLMN continuity. In some embodiments, the information from this field is used in various registration messages, as described more fully below.

Preference for PLMN continuity refers generally to preferences for a MS in respect of the maintenance of continuity of PLMN when moving between different network types. This preference is referred to as the PLMN continuity preference (PCP). In some embodiments, the PCP is used to indicate one of four preferences. These four specific preferences are described below. More generally, the number of possible preferences, and their definitions, may be different than this specific example.

PLMN Continuity Required

Generally, the PLMN Continuity Required preference indication is used to indicate that the MS requires PLMN continuity.

PLMN Continuity Preferred

The MS may "prefer" PLMN continuity and can use the PLMN Continuity Preferred indication.

NIN Associated with HPLMN or EHPLMN Required

The NIN Associated with HPLMN or EHPLMN required indication is the case where the user (or the user's operator) wants to force the MS to use a NIN associated with the HPLMN or EHPLMN.

No Preference

The No Preference indication is used to indicate that there is no restriction on the NIN used.

Figure 7:
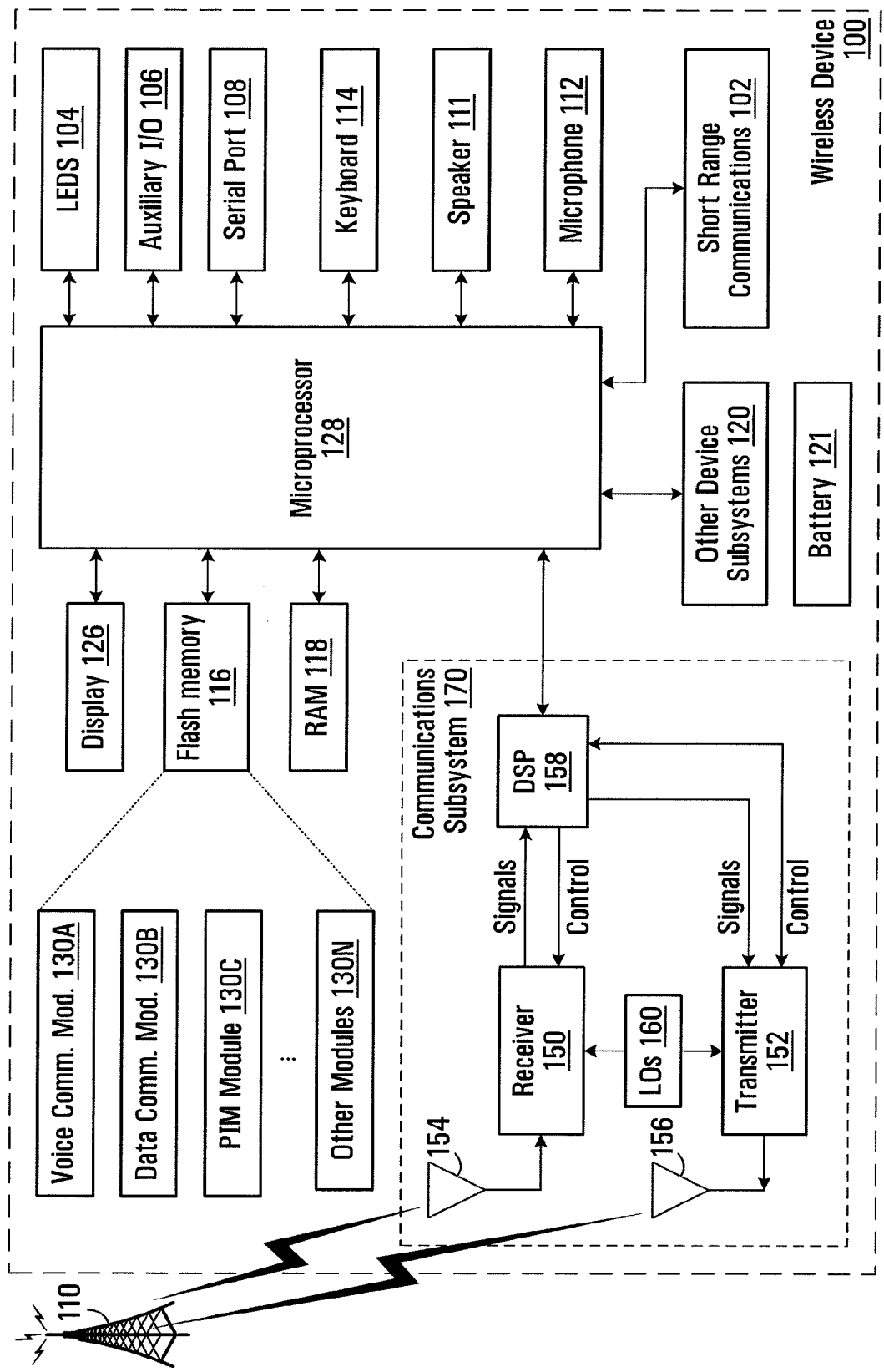
FIG. 7 is a block diagram of another mobile device.

Referring now to FIG. 7, shown is a block diagram of a wireless device 100 that may, for example, implement any of the MS methods described in this disclosure. The wireless device 100 is operable for implementing aspects of the disclosure, but the disclosure should not be limited to these implementations. Though illustrated as a mobile phone, the wireless device 100 may take various forms including a wireless handset, a pager, a personal digital assistant (PDA), a portable computer, a tablet computer, or a laptop computer, wireless or wired or fixed devices including standard wired telephone handset, set-top boxes, and the like. Many suitable devices combine some or all of these functions. In some embodiments of the disclosure, the wireless device 100 is not a general purpose computing device like a portable laptop or tablet computer, but rather is a special-purpose communications device such as a mobile phone, wireless handset, pager, or PDA. In another embodiment, the wireless device 100 may be a portable laptop or other computing device. The wireless device 100 may support specialized activities such as gaming, inventory control, job control, and/or task management functions, and so on. It is to be understood that the wireless device 100 is shown with very specific details for exemplary purposes only. A processing device (a microprocessor 128) is shown schematically as coupled between a keyboard or other user interface 114 and a display 126, which may also operate as a user interface. The microprocessor 128 controls operation of the display 126, as well as overall operation of the wireless device 100, in response to actuation of keys on the keyboard 114 or other user interface by a user.

The wireless device 100 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the wireless device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The wireless device 100 may have a battery 121 to power the active elements of the wireless device 100. The wireless device 100 is in some embodiments a two-way radio frequency (RF) communication device having voice and data communication capabilities. In addition, the wireless device 100 in some embodiments has the capability to communicate with computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the wireless device 100 may also be stored to the RAM 118.

The microprocessor 128, in addition to its operating system functions, enables execution of software applications on the wireless device 100. A predetermined set of software applications that control basic device operations, such as a voice communications module 130A and a data communications module 130B, may be installed on the wireless device 100 during manufacture. In addition, a personal information manager (PIM) application module 130C may also be installed on the wireless device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The communication subsystem 170 having the transmitter 152 and the receiver 150 includes functionality for implementing one or more of the embodiments described above in detail. The specific design and implementation of the communication subsystem 170 is dependent upon the communication network in which the wireless device 100 is intended to operate. For example, the communication subsystem 170 of the wireless device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1× and 1×EV-DO. The communication subsystem 170 may also be designed to operate with an 802.11 Wi-Fi network, and/or an 802.16 WiMAX network. Other types of data and voice networks, both separate and integrated, may also be utilized with the wireless device 100.

Network access may vary depending upon the type of communication system. For example, in the Mobitex™ and DataTACT™ networks, wireless devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the wireless device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the wireless device 100. In addition, the display 126 may also be utilized in voice communication mode, for example, to display the identity of a calling party, the duration of a voice call, or other voice call related information.

The short-range communications subsystem 102 enables communication between the wireless device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

In some implementations, the wireless device 100 is capable of operating in multiple modes such that it can engage in both CS (Circuit-Switched) as well as PS (Packet-Switched) communications, and can transition from one mode of communications to another mode of communications without loss of continuity. Other implementations are possible.

Numerous modifications and variations of the present application are possible in light of the above teachings. It is therefore to be understood that within the scope of the appended claims, embodiments may be practiced otherwise than as specifically described herein.

We claim:

1. A method comprising:
   making a network list consisting of the PLMNs that are available via a second network type by looking at available PLMNs in conjunction with a previously received PLMN list;
   making a list of available PLMNs for a first network type;
   comparing the network list to a list of available PLMNs for the first network type;
   determining a common PLMN that is available via both the first network type and the second network type or determining a PLMN available in the first network type for which there is an EPLMN available in the second network type;
   attempting to perform registration in the first network type and the second network type with the common PLMN, or the PLMN, EPLMN combination thus determined.

2. The method of claim 1 wherein:
   making a network list comprises making a GAN network list consisting of the PLMNs that are available via GAN by looking at available PLMNs in conjunction with a previously received GAN PLMN list;
   making a list of available networks for the first network type comprises making a list of available PLMNs for cellular;
   comparing the network list to a list of available PLMNs for the first network type comprises comparing the GAN network list to a list of available PLMNs for cellular;
   determining a common PLMN that is available via both the first network type and the second network type or determining a PLMN available in the first network type for which there is an EPLMN available in the second network type comprises determining a common PLMN that is available via both GAN and cellular or determining a PLMN available in cellular for which there is an EPLMN available in GAN;
   attempting to perform registration in the first network type and the second network type with the common PLMN, or the PLMN, EPLMN combination thus determined comprises attempting to perform cellular and GAN registration.

3. The method of claim 1 further comprising:
   sorting the PLMNs according to the prioritization for network selection.

4. The method of claim 3 wherein attempting to perform cellular and GAN registration with a PLMN,GAN combination thus determined comprises trying to register with PLMN, GAN combinations according to priority.

5. The method of claim 4 further comprising:
   receiving information from the network containing network prioritization information, the prioritization information prioritizing networks such that networks for which PLMN continuity is possible are prioritized above networks for which PLMN continuity is not possible.

6. The method of claim 4 further comprising:
   over time, learning which PLMNs support both a first network type and a second network type, and prioritizing such PLMNs above others;
   performing PLMN selection based on the prioritization.

7. The method of claim 2 wherein attempting to perform cellular and GAN registration comprises:
   attempting to register with a new PLMN;
   if successful, then using the GAN PLMN list sent from the Default GANC, attempting to register on a GANC that is associated with the new PLMN.

8. A mobile station comprising:
   a first wireless network radio for accessing a first network type;
   a second wireless network radio for accessing a second network type;
   a network selector configured to:
   make a network list consisting of the PLMNs that are available via a second network type by looking at available PLMNs in conjunction with a previously received PLMN list;
   make a list of available PLMNs for a first network type;
   compare the network list to a list of available PLMNs for the first network type;
   determine a common PLMN that is available via both the first network type and the second network type or determining a PLMN available in the first network type for which there is an EPLMN available in the second network type;
   attempt to perform registration in the first network type and the second network type with the common PLMN, or the PLMN, EPLMN combination thus determined.

9. The mobile station of claim 8 wherein:
   the network selector is configured to make a network list by making a GAN network list consisting of the PLMNs that are available via GAN by looking at available PLMNs in conjunction with a previously received GAN PLMN list;
   the network selector is configured to make a list of available networks for the first network type by making a list of available PLMNs for cellular;
   the network selector is configured to compare the network list to a list of available PLMNs for the first network type by comparing the GAN network list to a list of available PLMNs for cellular;
   the network selector is configured to determine a common PLMN that is available via both the first network type and the second network type or determine a PLMN available in the first network type for which there is an EPLMN available in the second network type by determining a common PLMN that is available via both GAN and cellular or determining a PLMN available in cellular for which there is an EPLMN available in GAN;
   the network selector is configured to attempt to perform registration in the first network type and the second network type with the common PLMN, or the PLMN, EPLMN combination thus determined by attempting to perform cellular and GAN registration.

10. The mobile station of claim 8 wherein the network selector is further configured to sort the PLMNs according to the prioritization for network selection.

11. The mobile station of claim 10 wherein the network selector is configured to attempt to perform cellular and GAN registration with a PLMN,GAN combination thus determined comprises trying to register with PLMN, GAN combinations according to priority.

12. The mobile station of claim 11 further configured to receive information from the network containing network prioritization information, the prioritization information prioritizing networks such that networks for which PLMN continuity is possible are prioritized above networks for which PLMN continuity is not possible.

13. The mobile station of claim 11 further configured to over time, learn which PLMNs support both a first network type and a second network type, and prioritizing such PLMNs above others, and to perform PLMN selection based on the prioritization.

14. The mobile station of claim 9 configured to attempt to register with a new PLMN, and if successful, then using the GAN PLMN list sent from the Default GANC, to attempt to register on a GANC that is associated with the new PLMN.

15. A computer readable medium having computer executable instructions for execution by a mobile station, that when executed, cause the mobile station to implement a method comprising:
    making a network list consisting of the PLMNs that are available via a second network type by looking at available PLMNs in conjunction with a previously received PLMN list;
    making a list of available PLMNs for a first network type;
    comparing the network list to a list of available PLMNs for the first network type;
    determining a common PLMN that is available via both the first network type and the second network type or determining a PLMN available in the first network type for which there is an EPLMN available in the second network type;
    attempting to perform registration in the first network type and the second network type with the common PLMN, or the PLMN, EPLMN combination thus determined.

16. The computer readable medium of claim 15 wherein the method further comprises:
    making a network list comprises making a GAN network list consisting of the PLMNs that are available via GAN by looking at available PLMNs in conjunction with a previously received GAN PLMN list;
    making a list of available networks for the first network type comprises making a list of available PLMNs for cellular;
    comparing the network list to a list of available PLMNs for the first network type comprises comparing the GAN network list to a list of available PLMNs for cellular;
    determining a common PLMN that is available via both the first network type and the second network type or determining a PLMN available in the first network type for which there is an EPLMN available in the second network type comprises determining a common PLMN that is available via both GAN and cellular or determining a PLMN available in cellular for which there is an EPLMN available in GAN;
    attempting to perform registration in the first network type and the second network type with the common PLMN, or the PLMN, EPLMN combination thus determined comprises attempting to perform cellular and GAN registration.

17. The computer readable medium of claim 15 wherein the method further comprises:
    sorting the PLMNs according to the prioritization for network selection.

18. The computer readable medium of claim 17 wherein attempting to perform cellular and GAN registration with a PLMN,GAN combination thus determined comprises trying to register with PLMN, GAN combinations according to priority.

19. The computer readable medium of claim 18 wherein the method further comprises:
    receiving information from the network containing network prioritization information, the prioritization information prioritizing networks such that networks for which PLMN continuity is possible are prioritized above networks for which PLMN continuity is not possible.

20. The computer readable medium of claim 18 wherein the method further comprises:
    over time, learning which PLMNs support both a first network type and a second network type, and prioritizing such PLMNs above others;
    performing PLMN selection based on the prioritization.

* * * * *